US012686754B2

(12) United States Patent
Noshita et al.

(10) Patent No.: US 12,686,754 B2
(45) Date of Patent: Jul. 21, 2026

(54) INFRARED ABSORBING PARTICLES, INFRARED ABSORBING PARTICLE DISPERSION LIQUID, INFRARED ABSORBING PARTICLE DISPERSION MATERIAL, INFRARED ABSORBING LAMINATE TRANSPARENT SUBSTRATE, AND INFRARED ABSORBING TRANSPARENT SUBSTRATE

(71) Applicant: SUMITOMO METAL MINING CO., LTD., Tokyo (JP)

(72) Inventors: Akinari Noshita, Kagoshima (JP); Takeshi Chonan, Kagoshima (JP); Takafumi Ito, Kagoshima (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 346 days.

(21) Appl. No.: 18/550,018

(22) PCT Filed: Mar. 10, 2022

(86) PCT No.: PCT/JP2022/010625
§ 371 (c)(1),
(2) Date: Sep. 11, 2023

(87) PCT Pub. No.: WO2022/209712
PCT Pub. Date: Oct. 6, 2022

(65) Prior Publication Data
US 2024/0158607 A1 May 16, 2024

(30) Foreign Application Priority Data

Mar. 31, 2021 (JP) ................................. 2021-060997
Aug. 30, 2021 (JP) ................................. 2021-140530

(51) Int. Cl.
*C08K 3/22* (2006.01)
*G02B 5/00* (2006.01)

(52) U.S. Cl.
CPC ................ *C08K 3/22* (2013.01); *G02B 5/003* (2013.01); *C08K 2003/2258* (2013.01)

(58) Field of Classification Search
CPC .. C08K 3/22; C08K 2003/2258; G02B 5/003; B29D 11/00
See application file for complete search history.

(56) References Cited

U.S. PATENT DOCUMENTS

2006/0178254 A1* 8/2006 Takeda ...................... C09D 5/32
264/171.25
2020/0170150 A1* 5/2020 Okada ................... C08L 101/12
(Continued)

FOREIGN PATENT DOCUMENTS

JP H08-012378 1/1996
JP H08-059301 3/1996
(Continued)

OTHER PUBLICATIONS

Mika Okada, Katsushi Ono, Satoshi Yoshio, Hideaki Fukuyama, Kenji Adachi, Oxygen vacancies and pseudo Jahn-Teller destabilization in cesium-doped hexagonal tungsten bronzes, Am Ceram Soc. 2019;102:5386-5400. (Year: 2019).*
(Continued)

*Primary Examiner* — Bijan Ahvazi
(74) *Attorney, Agent, or Firm* — IPUSA, PLLC

(57) ABSTRACT

Infrared absorbing particles include composite tungsten oxide particles, wherein the composite tungsten oxide particles have a hexagonal crystal structure, and wherein the composite tungsten oxide particles are represented by a general formula $M_xW_yO_z$ (where M is one or more elements
(Continued)

10 selected from Cs, Rb, K, Tl, Ba, Ca, Sr, and Fe, W is tungsten, O is oxygen, $0.25 \leq x/y \leq 0.39$, and $2.70 \leq z/y \leq 2.90$).

16 Claims, 4 Drawing Sheets

(56) References Cited

U.S. PATENT DOCUMENTS

| | | | | |
|---|---|---|---|---|
| 2021/0070961 A1* | 3/2021 | Nakayama | ................ | C08K 9/04 |
| 2021/0087070 A1* | 3/2021 | Nakayama | ............. | C01G 41/02 |
| 2023/0070110 A1 | 3/2023 | Adachi et al. | | |

FOREIGN PATENT DOCUMENTS

| | | |
|---|---|---|
| JP | H08-283044 | 10/1996 |
| JP | H10-183334 | 7/1998 |
| JP | 2005-187323 | 7/2005 |
| JP | 4096205 | 6/2008 |
| JP | 2017-105705 | 6/2017 |
| WO | 2021/153693 | 8/2021 |

OTHER PUBLICATIONS

International Search Report mailed on May 31, 2022 with respect to PCT/JP2022/010625.

Okada, Mika et al. "Oxygen vacancies and pseudo Jahn-Teller destabilization in cesium-doped hexagonal tungsten bronzes", Mar. 22, 2018, J Am Ceram Soc,2019, 102, 5386-5400, DIO: 10.1111/jace.16414.

Machida, Keisuke et al., "Excitations of free and localized electrons at nearby energies in reduced cesium tungsten bronze nanocrystals", Dec. 12, 2018, J. Appl. Phys., 125, 103103 (2019), DOI: 10.1063/1.5085374.

Seyed Hossein Hosseini et al., "Study of UV-Visible and near infrared absorption CsXWO3/polypyrrole nanocomposite", Materials Research Innovations, Oct. 16, 2019, 24:6, 335-340, DOI: 10.1080/14328917.2019.1677302.

\* cited by examiner

30

312

32

311

40

41A

42

41

INFRARED ABSORBING PARTICLES, INFRARED ABSORBING PARTICLE DISPERSION LIQUID, INFRARED ABSORBING PARTICLE DISPERSION MATERIAL, INFRARED ABSORBING LAMINATE TRANSPARENT SUBSTRATE, AND INFRARED ABSORBING TRANSPARENT SUBSTRATE

TECHNICAL FIELD

The present invention relates to infrared absorbing particles, an infrared absorbing particle dispersion liquid, an infrared absorbing particle dispersion material, an infrared absorbing laminate transparent substrate, and an infrared absorbing transparent substrate.

BACKGROUND OF THE INVENTION

As a method of removing and reducing heat components from external light sources such as sunlight and light bulbs, it has been conventionally carried out to form coating films made of materials reflecting infrared rays on a glass surface to form a heat reflecting glass. As the materials, metal oxides such as $FeO_x$, $CoO_x$, $CrO_x$, $TiO_x$, and the like and metal materials such as Ag, Au, Cu, Ni, Al, and the like have been used.

However, since these metal oxides and metal materials have the property of reflecting or absorbing visible light at the same time in addition to infrared light, which greatly contributes to the thermal effect, there is a problem that the visible light transmittance of the heat reflecting glass decreases. In particular, since high transmittance is required in the visible light region for base materials used for building materials, vehicles, telephone boxes, or the like, the film thickness had to be very thin when using materials such as the above metal oxides. For this reason, spray baking, CVD, or physical deposition methods such as sputtering or vacuum evaporation are used to deposit a thin film with a thickness approximately 10 nm or less.

However, these film deposition methods require large equipment and vacuum facilities, have disadvantages in productivity and large area, and have disadvantages that increase the production cost of the film. In addition, when these materials are used to increase the solar radiation shielding characteristics, the reflectance of light in the visible light region tends to increase at the same time, and these materials have disadvantages that give a glaring appearance like a mirror and damage the aesthetics.

In order to improve such problems, it is considered necessary to have a film with low reflectance of light in the visible light region and high reflectance in the infrared region as the physical properties of the film.

Antimony tin oxide (hereinafter abbreviated as ATO) and indium tin oxide (hereinafter abbreviated as ITO) are known as materials with high transmittance of visible light and excellent solar radiation shielding function. These materials do not give a glaring appearance due to their relatively low visible light reflectance. However, because the plasma frequency is in the near-infrared region, the reflection and absorption effects of light in the near-infrared region, which is closer to the visible light region, are still not sufficient. Furthermore, because the solar radiation shielding power per unit weight of these materials is low, the amount of use becomes large and the cost becomes high to obtain a high shielding function.

In addition, as an infrared radiation shielding film material having a solar radiation shielding function, a film in which tungsten oxide, molybdenum oxide, and vanadium oxide are slightly reduced is used. Although these films are used as so-called electrochromic materials, these films are transparent in a sufficiently oxidized state, and when reduced by an electrochemical method, absorption occurs from the long-wavelength visible light region to the near-infrared region.

In Patent Document 1, a heat shielding glass is proposed in which a first dielectric film is provided on a transparent glass substrate as a first layer from the substrate side, a composite tungsten oxide film containing at least one metal element selected from groups IIIc, IVa, Vb, VIb and VIIb of the periodic table is provided as a second layer on the first layer, and a second dielectric film is provided as a third layer on the second layer.

In Patent Document 2, a first transparent dielectric film contains an oxide having ultraviolet shielding function, in which the oxide includes at least one of the group consisting of zinc, cerium, titanium, and cadmium; and their composite oxides or composite oxides with trace amounts of metallic elements added to these oxides. The first transparent dielectric film is provided on a transparent glass substrate and laminated as a first layer from the substrate. A second transparent dielectric film is provided on the first layer as a second layer, a composite tungsten oxide film containing at least one metal element selected from groups IIIc, IVa, Vb, VIb and VIIb of the periodic table is provided on the second layer as a third layer, and a third transparent dielectric film is provided on the third layer as the fourth layer. A third transparent dielectric film is provided as a fourth layer on the third layer.

In Patent Document 3, a heat-shielding glass is proposed, characterized in that a composite tungsten oxide film containing at least one metal element selected from a group consisting of groups IIIa, IVa, Vb, VIb and VIIb of the periodic table is provided on a transparent substrate as the first layer from the substrate side, and a transparent dielectric film is provided as the second layer on the first layer.

In Patent Document 4, a method of depositing a tungsten oxide film on a substrate is proposed, which is characterized by sputtering in an atmosphere containing carbon dioxide using a target consisting of tungsten. Patent Document 4 discloses that the method can stably produce tungsten oxide films with high heat shielding properties and uniform in-plane optical properties.

For example, as described in Patent Documents 1 to 4, a sputtering method has been conventionally used as a method of producing an infrared shielding layer containing a tungsten compound. However, such a physical film deposition method requires a large amount of equipment and vacuum facilities, and has a problem from the viewpoint of productivity, and has a problem that the film production cost is high even though it is technically possible to increase the area.

Therefore, the applicant disclosed Patent Document 5. Patent Document 5 discloses an infrared shielding material fine particle dispersion material, an infrared shielding material, and a method of producing infrared shielding material fine particles, and the infrared shielding material fine particles, wherein tungsten oxide particulates represented by the general formula $W_yO_x$, which transmit light in the visible light region and absorb light in the infrared region, or composite tungsten oxide fine particles represented by the general formula $M_xW_yO_z$, are dispersed in a medium.

In addition, the applicant disclosed Patent Document 6. Patent Document 6 discloses a method of producing tungsten oxide fine particles for forming a solar radiation shielding material and tungsten oxide fine particles for forming a solar radiation shielding material, wherein the tungsten oxide fine particles are represented by the general formula $W_yO_x$ or composite tungsten oxide fine particles are represented by the general formula $M_xW_yO_z$, which transmit light in the visible light region and absorb light in the infrared region.

As disclosed in Patent Documents 5 and 6, solar radiation shields containing tungsten oxide fine particles and the like do not require large-scale equipment or vacuum facilities such as physical film deposition methods, have high productivity, and can be produced at low cost. Furthermore, from the viewpoint of characteristics of solar radiation shields, solar radiation shields containing tungsten oxide fine particles and the like can improve light transmission in the visible light region without decreasing infrared radiation shielding performance.

RELATED-ART DOCUMENT

Patent Documents

[Patent Document 1] Japanese Unexamined Patent Application Publication No. Hei 8-12378

[Patent Document 2] Japanese Unexamined Patent Application Publication No. Hei 8-59301

[Patent Document 3] Japanese Unexamined Patent Application Publication No. Hei 8-283044

[Patent Document 4] Japanese Unexamined Patent Application Publication No. Hei 10-183334

[Patent Document 5] Japanese Patent No. 4096205

[Patent Document 6] Japanese Patent No. 4626284

SUMMARY OF THE INVENTION

Problems to be Solved by the Invention

However, conventionally used optical members (films, resin sheets, or the like) including tungsten oxide fine particles represented by general formula $W_yO_x$ and composite tungsten oxide fine particles represented by general formula $M_xW_yO_z$ exhibited blueish color of tungsten oxide. Therefore, optical members with a pale color have been demanded depending on the application.

In addition, when the infrared absorbing material is used, the infrared absorbing material may be placed under a high temperature and high humidity environment due to heat caused by sunlight or humidity in the atmosphere. For this reason, the infrared absorbing material is required to suppress the decrease of the infrared absorbing property (solar radiation shielding property) even when the infrared absorbing material is placed under a high temperature and high humidity environment, that is, to have excellent weather resistance.

In view of the above problems of the prior art, an object of an aspect of the present invention is to provide infrared absorbing particles having pale blue color and excellent weather resistance and infrared absorbing property.

Means for Solving the Problems

In one aspect of the present invention, the present invention provides infrared absorbing particles containing composite tungsten oxide particles, wherein the composite tungsten oxide particles have a hexagonal crystal structure, and wherein the composite tungsten oxide particles are represented by a general formula $M_xW_yO_z$ (where M is one or more elements selected from Cs, Rb, K, Tl, Ba, Ca, Sr, and Fe, W is tungsten, O is oxygen, $0.25 \leq x/y \leq 0.39$, and $2.70 \leq z/y \leq 2.90$).

Effects of the Invention

In one aspect of the present invention, infrared absorbing particles having pale blue color and excellent weather resistance and infrared absorbing properties can be provided.

DETAILED DESCRIPTION OF THE INVENTION

Figure 1:
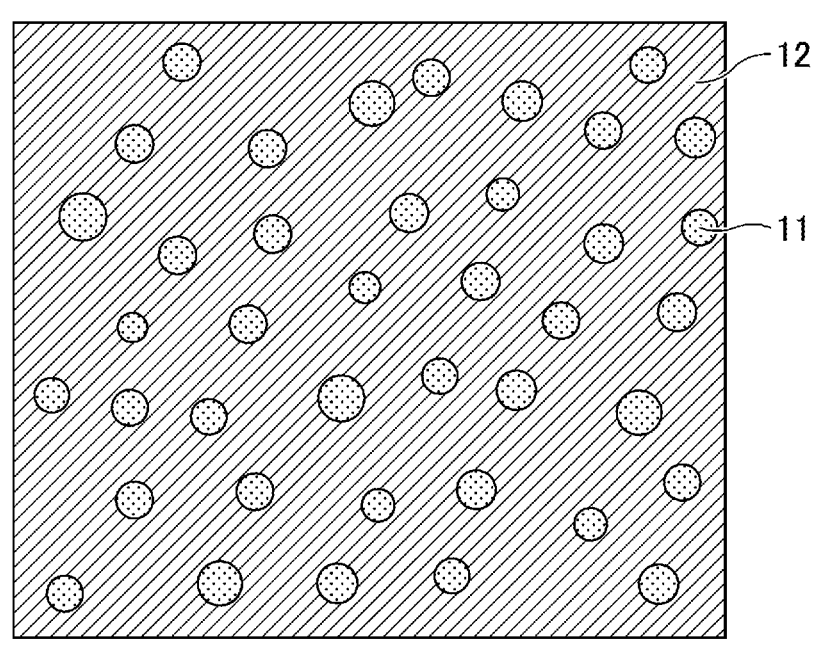
FIG. 1 is a schematic diagram of an infrared absorbing particle dispersion liquid.

Specific examples of infrared absorbing particles, an infrared absorbing particle dispersion liquid, an infrared absorbing particle dispersion material, an infrared absorbing laminate transparent substrate, and an infrared absorbing transparent substrate according to an embodiment of the present embodiment (hereinafter referred to as the "present embodiment") will be described below. It should be noted that the present invention is not limited to these examples, but is presented in the claims and is intended to include all changes within the meaning and scope of the claims.

The embodiments of the present invention are explained in the following order: 1. infrared absorbing particles, 2. a method of producing infrared absorbing particles, 3. an infrared absorbing particle dispersion liquid, 4. an infrared absorbing particle dispersion material, 5. an infrared absorbing laminate transparent substrate, 6. an infrared absorbing transparent substrate, and 7. physical properties.

1. Infrared Absorbing Particles

The infrared absorbing particles according to the present embodiment can contain composite tungsten oxide particles. The infrared absorbing particles according to the present embodiment can be only composed of composite tungsten oxide particles, but even in this case, the inclusion of unavoidable impurities is not excluded.

The composite tungsten oxide particles may be composite tungsten oxide particles represented by the general formula $M_xW_yO_z$.

The M element in the above general formula may be one or more elements selected from Cs, Rb, K, Tl, Ba, Ca, Sr, and Fe, where W is tungsten and O is oxygen. The x, y, and z may satisfy $0.255 \leq x/y \leq 0.39$ and $2.705 \leq z/y \leq 2.90$.

The composite tungsten oxide particles may have a hexagonal crystal structure.

Composition, Crystals, and Lattice Constant of Composite Tungsten Oxide Particles In the above general formula of the composite tungsten oxide particles, the value of x/y representing the additive amount of element M is preferably in a range from 0.25 to 0.39, and more preferably in a range from 0.25 to 0.32. If the value of x is 0.25 to 0.39, the composite tungsten oxide particles of hexagonal crystal are easily obtained, and the infrared absorbing effect is sufficiently exerted. The infrared absorbing particles may contain tetragonal or orthorhombic precipitates represented by $M_{0.36}WO_{3.18}$ ($Cs_4W_{11}O_{35}$ or the like) in addition to hexagonal composite tungsten oxide particles, but these precipitates do not affect the infrared absorbing effect. The composite tungsten oxide particles are theoretically expected to have a value of x/y of 0.33, which means that the added M elements are located in all the hexagonal voids.

The z/y value in the above general formula is preferably in a range from $2.70 \leq z/y \leq 2.90$. If the z/y value is set to 2.70 or more, infrared absorbing particles having pale blue color, excellent weather resistance, and infrared absorbing property can be obtained. In addition, if the z/y value is set to 2.70 or more, for example, the light transmittance at a wavelength of 850 nm can be increased. With the advancement of automobile functions, in-vehicle devices and sensors that use infrared communication waves for control are widely used. In order to improve the control accuracy of various in-vehicle devices and the detection accuracy of sensors, it is necessary to design high light transmittance at a wavelength of 850 nm. Since the infrared absorbing particles of the present embodiment have excellent light transmittance at a wavelength of 850 nm as described above, in automobiles and other vehicles in which infrared absorbing particle dispersions using the infrared absorbing particles are placed in windows and other openings, the accuracy of control of in-vehicle devices and detection of sensors can be improved.

If the value of z/y is set to 2.90 or less, a particularly sufficient amount of free electrons is generated in order to enhance the absorption and reflection properties of the infrared region, and the infrared absorbing particles can be made to be efficient.

In the composite tungsten oxide particles, a part of oxygen may be replaced by another element. Examples of such other elements include nitrogen, sulfur, halogen, and the like.

The composite tungsten oxide particles preferably have a hexagonal crystal structure. This is because, when the composite tungsten oxide particles have a hexagonal crystal structure, the transmittance of light in the visible light region and the absorption of light in the near infrared region of the composite tungsten oxide particles and the infrared absorbing particles including the composite tungsten oxide particles are particularly improved.

When one or more elements selected from Cs, Rb, K, Tl, Ba, Ca, Sr, and Fe are used for the M element, the hexagonal crystal is easily formed. Therefore, the M element preferably contains one or more elements selected from Cs, Rb, K, Tl, Ba, Ca, Sr, and Fe.

The lattice constant of the composite tungsten oxide particles is not particularly limited, but preferably, for example, the a-axis is in a range from 7.3850 Å to 7.4186 Å and the c-axis is in a range from 7.5600 Å to 7.6240 Å. Although the infrared absorbing particles including the composite tungsten oxide particles can be pulverized or the like to achieve a desired particle size as described later, the lattice constant of the composite tungsten oxide particle before and after pulverization preferably satisfies the above range.

Particle Size

The particle size of the infrared absorbing particles of the present embodiment can be selected by the use of the infrared absorbing particles, the infrared absorbing particle dispersion liquid, the infrared absorbing particle dispersion material, the infrared absorbing laminate transparent substrate, the infrared absorbing transparent substrate, and the like, and is not particularly limited.

The average dispersion particle size of the infrared absorbing particles is preferably, for example, in a range from 1 nm to 800 nm, and more preferably in a range from 1 nm to 400 nm. This is because if the average dispersion particle size is 800 nm or less, the infrared absorbing particle can exert a strong infrared absorbing ability, and if the average dispersion particle size is 1 nm or more, industrial manufacturing becomes easy.

In particular, if the average dispersion particle size is 400 nm or less, the infrared absorbing film or the molded body (plates, sheets) can avoid becoming a grayish color with monotonically reduced transmittance. Further, if the average dispersion particle size is set to 400 nm or less, when the infrared absorbing particle dispersion liquid is used as an infrared absorbing particle dispersion material or the like, the haze can be particularly suppressed and the visible light transmittance can be enhanced.

When the infrared absorbing particle dispersions and the like are used in applications where transparency of light in the visible light region is required, an average dispersion particle diameter of the infrared absorbing particles is preferably 40 nm or less. Here, the average dispersion particle size is set to 50% volume cumulative particle size measured using DLS-8000 manufactured by Otsuka Electronics Co., Ltd., which is based on the dynamic light scattering method. This is because, if the average dispersion particles size of the infrared absorbing particles is smaller than 40 nm, scattering of light by Mie scattering and Rayleigh scattering of the infrared absorbing particles can be sufficiently suppressed to maintain high visibility of light in the visible light region, and at the same time, transparency can be efficiently maintained. When the infrared absorbing particles are used for applications where transparency is particularly required, such as windshields for automobiles, the average dispersion particle size of the infrared absorbing particles is more preferably 30 nm or less, and more preferably 25 nm or less, in order to further suppress scattering.

The particle size of the composite tungsten oxide particles pertaining to the infrared absorbing particles described above can be appropriately selected according to the purpose of use of the composite tungsten oxide particles, the infrared absorbing film produced using the dispersion liquid, the infrared absorbing particle dispersion material, the infrared absorbing transparent substrate, and the infrared absorbing laminate transparent substrate, and is not particularly limited. The particle size of the composite tungsten oxide particles is preferably in a range from 1 nm to 800 nm. When transparency is emphasized, the particle size of the composite tungsten oxide particle is preferably 200 nm or less, and more preferably 100 nm or less. This is because, when the particle size is large, light in the visible light region with a wavelength of 380 nm to 780 nm is scattered by geometric scattering or Mie scattering, and the appearance of the infrared absorbing material becomes cloudy glass, making it difficult to obtain clear transparency. When the particle size is 200 nm or less, the scattering is reduced, and the Rayleigh scattering region is formed. In the Rayleigh scattering region, the scattered light is reduced in proportion to the sixth power of the particle size, therefore, the scattering is reduced and the transparency is improved with the decrease of the particle size. Furthermore, when the particle size is 100 nm or less, the scattered light becomes less and is preferable. As described above, when the particle size is 800 nm or less, the composite tungsten oxide particles according to the present embodiment can exhibit excellent infrared absorbing properties, and when the particle size is 1 nm or more, the composite tungsten oxide particles can be easily manufactured industrially.

The particle size can be calculated by measuring the particle size of a plurality of particles using a transmission electron microscope (TEM) or the like in a state where the composite tungsten oxide particles are dispersed, for example. Since composite tungsten oxide particles are usually irregularly shaped, the diameter of the smallest circle circumscribed to the particle can be used as the particle diameter of the particle. For example, when the particle sizes of a plurality of particles are measured for each particle as described above using a transmission electron microscope, it is preferable that the particle sizes of all particles satisfy the above range. The number of particles to be measured is not particularly limited, but it is preferable that the number of particles to be measured is, for example, 10 to 50.

Color

The infrared absorbing particles of the present embodiment preferably satisfy b*>0 in the color tone of L*a*b* color system when only light absorption by the infrared absorbing particles is calculated.

This is because the color tone of the infrared absorbing particles when only light absorption of the infrared absorbing particles is calculated satisfies b*>0 in the L*a*b* color system, thereby making it pale blue.

When only light absorption by the infrared absorbing particles is calculated, it means that a blank is measured at the time of evaluation, and the evaluation result of the blank is subtracted from the evaluation result of the infrared absorbing particles to eliminate the influence of light reflection by a cell or the like used at the time of measurement.

Coating

Infrared absorbing particles can also be surface-treated for surface protection, durability improvement, oxidation prevention, and water resistance improvement. Although the specific content of the surface treatment is not particularly limited, for example, the infrared absorbing particles of the present embodiment can be coated with a compound containing one or more atoms selected from Si, Ti, Zr, and Al. That is, the infrared absorbing particles can be coated with the compound. The compound containing one or more atoms selected from Si, Ti, Zr, and Al includes one or more kinds selected from oxides, nitrides, carbides, and the like.

2. Method of Producing Infrared Absorbing Particles

According to the method of producing the infrared absorbing particles of the present embodiment, the infrared absorbing particles described above can be produced. For this reason, the descriptions already described will be omitted.

The inventors of the present invention have studied a method of producing infrared absorbing particles having pale blue color and excellent weather resistance and infrared absorbing properties.

It should be noted that the weather resistance in the present invention means, for example, that the infrared absorbing particle dispersion material can suppress the deterioration of solar radiation shielding properties when placed in an environment of high temperature and high humidity.

As a result, it was found that infrared absorbing particles that can solve the above problems can be obtained by performing the following first heat treatment process and the second heat treatment process for a predetermined raw material, thereby completing the present invention.

The first heat treatment process (oxidizing gas heat treatment process) is a heat treatment process under an atmosphere of a first gas containing at least an oxygen source.

The second heat treatment process (non-oxidizing gas heat treatment process) is a heat treatment process under an atmosphere of a second gas containing one or more kinds selected from reducing gas and inert gas.

The order in which the first heat treatment process and the second heat treatment process are performed is not particularly limited; for example, the second heat treatment process may be performed after the first heat treatment process is performed, and the first heat treatment process may be performed after the second heat treatment process is performed.

After the raw material powder to be subjected to heat treatment is explained here, the heat treatment conditions will be described in detail.

(1) Raw Material Powder

The raw material powder is one or more kinds selected from the dry powder of a mixed solution of tungstic acid ($H_2WO_4$) or a tungstic acid mixture and an M element-containing compound, and a mixed solution of tungstic acid ($H_2WO_4$) or a tungstic acid mixture and an M element-containing solution.

The tungstic acid mixture is a mixture of tungstic acid ($H_2WO_4$) and tungsten oxide.

The mixed powder and the dry powder will be described below.

Mixed Powder

As the raw material powder, mixed powder can be used as described above. As the mixed powder, for example, mixed powder of tungstic acid and M element-containing compound or mixed powder of tungstic acid mixture and M element-containing compound can be used.

Here, tungstic acid ($H_2WO_4$) used for the raw material powder is not particularly limited as long as the tungstic acid becomes an oxide when fired. Any of $W_2O_3$, $WO_2$, and $WO_3$ may be used as the tungsten oxide used in the tungstic acid mixture.

The M element-containing compound mixed with tungstic acid or a tungstic acid mixture and used for adding the M element is preferably one or more kinds selected from oxides, hydroxides, and carbonates. For this reason, the M element-containing compound is preferably one or more kinds selected from oxides of the M element, hydroxides of the M element, and carbonates of the M element.

The M element is preferably one or more elements selected from Cs, Rb, K, Tl, Ba, Ca, Sr, and Fe.

Tungstic acid ($H_2WO_4$) or a tungstic acid mixture and the M element-containing compound may be mixed by a commercially available grinder, kneader, ball mill, sand mill, paint shaker, and the like (mixing step).

Dry Powder

As the raw material powder, dry powder of a mixed solution of tungstic acid ($H_2WO_4$) or a tungstic acid mixture and a solution containing the M element can be used.

Since tungstic acid and a tungstic acid mixture have been described in terms of mixed powders, the description is omitted here.

The solution containing the M element is preferably one or more kinds selected from an aqueous solution of a metal salt of the M element, a colloidal solution of a metal oxide of the M element, and an alkoxy solution of the M element.

The metal salts used in the aqueous solution of the metal salt of the M element are not particularly limited. Examples of the metal salts include nitrates, sulfates, chlorides, carbonates, and the like.

In addition, the drying temperature and time for preparing the dry powder are not particularly limited.

The raw powder preferably contains tungsten and an M element in a proportion corresponding to the desired composition. For example, the raw powder preferably contains an M element (M) and tungsten (W) contained in the raw powder so that the M/W is 0.25 to 0.39 in a molar ratio.

(2) Heat Treatment Process

The method of producing the infrared absorbing particles of the present embodiment may include a first heat treatment process for heat treating the raw material powder and a second heat treatment process as described above.

(2-1) First Heat Treatment Process

The first heat treatment process (oxidizing gas heat treatment process) is a step of heat treatment under an atmosphere of a first gas containing at least an oxygen source.

The gas of the oxygen source is not particularly limited, but one or more kinds selected from oxygen gas, air gas, and steam are preferably used.

The gas other than the oxygen source of the first gas is not particularly limited, but can contain, for example, an inert gas. The inert gas is not particularly limited, and one or more gas selected from nitrogen, argon, helium, and the like can be used.

The concentration of the oxygen source in the first gas may be appropriately selected in accordance with the heat treatment temperature and the amount of the substance to be heat treated, and is not particularly limited. However, since excessive oxidation may lower the infrared absorption function, it is preferable to adjust the concentration to oxidize only the surface of the particles.

The temperature at the time of heat treatment may be appropriately selected in accordance with the amount of the raw material powder to be heat treated, and is not particularly limited. For example, the temperature is preferably in a range from 400° C. to 850° C.

By performing an oxidation treatment in the first heat treatment process, for example, the surface of the composite tungsten oxide particles can be oxidized to become polaron-absorbing free. By performing the first heat treatment process, the transmittance of the wavelength of the infrared communication wave becomes high, and the infrared absorbing particles having pale blue color and high weather resistance (heat resistance and wet heat resistance) can be obtained.

The first heat treatment process may be performed in one step, but the step may be a plurality of steps in which the atmosphere and temperature are changed during the heat treatment. For example, in the first step, heat treatment may be performed at 400° C. to 850° C. under a mixed gas atmosphere of an inert gas and a gas of an oxygen source, and in the second step, heat treatment may be performed at 400° C. to 850° C. under an inert gas atmosphere. By performing the first heat treatment process in a plurality of steps as described above, infrared absorbing particles having a particularly excellent infrared absorbing function can be obtained.

(2-2) Second Heat Treatment Process

The second heat treatment process (non-oxidizing gas heat treatment process) is a heat treatment process under an atmosphere of a second gas containing one or more gas selected from reducing gas and inert gas.

By carrying out the second heat treatment process, oxygen vacancies can be formed in the infrared absorbing particles.

As described above, the atmosphere at the time of heat treatment in the second heat treatment process may be an inert gas alone, a reducing gas alone, or a mixture of an inert gas and a reducing gas.

As the inert gas, one or more gas selected from nitrogen, argon, helium, or the like may be used.

The reducing gas is not particularly limited, and one or more gas selected from hydrogen, alcohol, and the like can be used.

When a gas mixture of an inert gas and a reducing gas is used as the second gas, the concentration of the reducing gas in the inert gas may be appropriately selected according to the heat treatment temperature, the amount of raw material powder to be heat treated, or the like. The concentration of the reducing gas in the inert gas is not particularly limited. The concentration of the reducing gas in the second gas is preferably, for example, 20% by volume or less, more preferably 10% by volume or less, and even more preferably 7% by volume or less.

This is because, if the concentration of the reducing gas in the second gas is set to 20% by volume or less, it is possible to avoid the formation of $WO_2$, W and the like, which do not have an infrared shielding function due to rapid reduction.

When a gas mixture is used as the second gas, the concentration of the reducing gas in the second gas, that is, the lower limit of the content ratio, is not particularly limited, but the content ratio of the reducing gas in the second gas is preferably more than 1% by volume. This is because when the content ratio of the reducing gas in the second gas is more than 1% by volume, oxygen vacancies can be generated more reliably.

The temperature at the time of heat treatment in the second heat treatment process may be appropriately selected according to the atmosphere, the amount of raw material powder to be heat treated, or the like. The temperature at the time of heat treatment in the second heat treatment process is not particularly limited. In the case where the atmosphere is an inert gas alone, from the viewpoint of crystallinity and coloring power, the temperature is preferably in a range from 400° C. to 1200° C., more preferably in a range from 500° C. to 1000° C., and even more preferably in a range from 500° C. to 900° C. Even in the case where the second gas contains a reducing gas, the temperature of the second heat treatment process is not particularly limited, but for example, the temperature range described above, which is the same as the case where the second gas is an inert gas alone, can be made to be a suitable range.

The second heat treatment process may be carried out in one step, but may be a plurality of steps in which the atmosphere and temperature are changed during the heat treatment. For example, the heat treatment in the first step may be carried out at 400° C. to 850° C. under a mixed gas atmosphere of an inert gas and a reducing gas, and the heat treatment in the second step may be carried out at 800° C. to 1000° C. under an inert gas atmosphere. By carrying out the second heat treatment process in a plurality of steps, infrared absorbing particles having an especially excellent infrared absorbing function can be obtained.

The heat treatment time in the second heat treatment process is not particularly limited, and may be suitably selected according to the heat treatment temperature, the atmosphere, and the amount of raw material powder to be heat treated, but, for example, may be 5 minutes to 7 hours.

By carrying out the above heat treatment processes, the infrared absorbing particles described above can be obtained. The method of producing the infrared absorbing particles according to the present embodiment may, if necessary, include a pulverizing step for pulverizing the infrared absorbing particles, a sieving step, or the like in order to achieve a desired particle size.

(3) Modification Step

As described above, the surface of the infrared absorbing particles may be modified with a compound containing one or more atoms selected from Si, Ti, Zr, and Al. Thus, the method of producing the infrared absorbing particles may further include a modification step in which, for example, the infrared absorbing particles are modified with a compound containing one or more atoms selected from Si, Ti, Zr, and Al.

In the modification step, specific conditions for modifying the infrared absorbing particles are not particularly limited. For example, the modification step may include adding an alkoxide or the like containing one or more metals selected from the metal group to the infrared absorbing particles to be modified, and forming a film on the surface of the infrared absorbing particles.

3. Infrared Absorbing Particle Dispersion Liquid

The infrared absorbing particle dispersion liquid of the present embodiment can contain a liquid medium and the infrared absorbing particles described above. Specifically, for example, as illustrated schematically in FIG. 1, the infrared absorbing particle dispersion liquid 10 can have a liquid medium 12 and the infrared absorbing particles 11 described above. The infrared absorbing particles 11 described above are preferably disposed in the liquid medium 12 and dispersed in the liquid medium 12. FIG. 1 is a schematic view, and the infrared absorbing particle dispersion liquid of the present embodiment is not limited to the embodiment. For example, in FIG. 1, the infrared absorbing particles 11 are described as spherical particles, but the shape of the infrared absorbing particles 11 is not limited to the embodiment and can have any shape. As described above, the infrared absorbing particles 11 can have a coating or the like on the surface, for example. In addition to the infrared absorbing particles 11 and the liquid medium 12, the infrared absorbing particle dispersion liquid 10 can also contain other additives as necessary.

(1) Components Contained

As described above, the infrared absorbing particle dispersion liquid of the present embodiment can contain a liquid medium and the infrared absorbing particles described above. Since the infrared absorbing particles are described above, description thereof will be omitted. Hereinafter, a liquid medium and a dispersant or the like which can contain an infrared absorbing particle dispersion liquid as necessary will be described.

(1-1) Liquid Medium

A liquid medium is not particularly limited, and various liquid media can be used, such as one selected from a group of liquid media materials consisting of water, organic solvents, oils and fats, liquid resins, and liquid plasticizers for plastics, or two or more mixtures selected from a group of liquid media materials.

Various organic solvents can be selected, such as alcohol-based, ketone-based, ester-based, amide-based, hydrocarbon-based, glycol-based, and the like. Specifically, examples of the alcohol-based solvents include methanol, ethanol, 1-propanol, isopropanol (isopropyl alcohol), butanol, pentanol, benzyl alcohol, diacetone alcohol, and 1-methoxy-2-propanol and the like; examples of the ketone-based solvents include dimethyl ketone, acetone, methyl ethyl ketone, methyl propyl ketone, methyl isobutyl ketone, cyclohexanone, isophorone, and the like; examples of the ester-based solvents include 3-methyl-methoxy-propionate, butyl acetate, and the like; examples of the glycol derivatives include ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate, and the like; examples of the amides include formamide, N-methylformamide, dimethylformamide, dimethylacetamide, N-methyl-2-pyrrolidone, and the like; examples of the aromatic hydrocarbons include toluene, xylene, and the like; examples of the halogenated hydrocarbons include ethylene chloride, chlorobenzene, and the like. Among these, organic solvents of low polarity are preferably used, especially isopropyl alcohol, ethanol, 1-methoxy-2-propanol, dimethyl ketone, methyl ethyl ketone, methyl isobutyl ketone, toluene, propylene glycol monomethyl ether acetate, n-butyl acetate, and the like. One or more of these solvents may be used in combination. If necessary, acid or alkali may be added to adjust the pH.

As examples of fats and oils, one or more fats and oils selected from dry oils such as linseed oil, sunflower oil, paulownia oil, and the like; semi-dry oils such as sesame oil, cottonseed oil, rapeseed oil, soybean oil, rice bran oil, and the like; non-dry oils such as olive oil, coconut oil, palm oil, dehydrated castor oil, and the like; fatty acid monoesters obtained by direct ester reaction between fatty acids of vegetable oils and monoalcohols; ethers; petroleum-based solvents such as ISOPAR (registered trademark) E, EXXSOL (registered trademark) Hexane, Heptane, E, D30, D40, D60, D80, D95, D110, D130 (manufactured by ExxonMobil); and the like can be used.

As the liquid resin, it is possible to use a liquid medium in which monomers, oligomers, thermoplastic resins, and the like that are cured by polymerization such as methyl methacrylate and styrene are dissolved.

Preferred examples of liquid plasticizers for plastics include plasticizers that are compounds of monohydric alcohols and organic acid esters, plasticizers that are ester systems such as polyhydric alcohol organic acid ester compounds, and plasticizers that are phosphate systems such as organophosphate plasticizers. In particular, triethylene glycol di-2-ethyl hexaonate, triethylene glycol di-2-ethyl butyrate, and tetraethylene glycol di-2-ethyl hexaonate are more preferable because of their low hydrolyzability.

(1-2) Dispersants, Coupling Agents, and Surfactants

The infrared absorbing particle dispersion liquid of the present embodiment may optionally contain one or more kinds selected from dispersants, coupling agents, and surfactants.

Although dispersants, coupling agents, and surfactants may be selected according to the application, materials having amine-containing groups, hydroxyl groups, carboxyl groups, or epoxy groups as functional groups may be suitably used.

The functional group adsorbs on the surface of the infrared ray absorbing particles, prevents aggregation of the infrared absorbing particles, and has an effect of dispersing the infrared absorbing particles particularly uniformly in the infrared absorbing film, for example, even when the infrared absorbing film is used.

The infrared absorbing particle dispersion liquid of the present embodiment may include a dispersant. The dispersant may include a coupling agent that functions as a dispersant and a surfactant. Suitable dispersants include, but are not limited to, one or more kinds selected from a phosphate ester compound, a polymer-based dispersant, a silane-based coupling agent, a titanate-based coupling agent, an aluminum-based coupling agent, and the like.

Examples of the polymer-based dispersants include one or more kinds selected from an acrylic-based polymer dispersant, a urethane-based polymer dispersant, an acrylic-block copolymer-based polymer dispersant, a polyether-based dispersant, a polyester-based polymer dispersant, and the like.

The additive amount of the dispersant is preferably in the range of 10 parts by mass to 1000 parts by mass and more preferably in the range of 20 parts by mass to 200 parts by mass, with respect to 100 parts by mass of the infrared absorbing particles. If the additive amount of the dispersant is in the above range, the infrared absorbing particles do not cause aggregation in the liquid medium, and dispersion stability can be particularly maintained.

(2) Method of Adding Infrared Absorbing Particles to Liquid Medium

The method of adding the infrared absorbing particles to the liquid medium is not particularly limited, but it is preferable that the method can disperse the infrared absorbing particles uniformly in the liquid medium.

For example, one or more the dispersion methods are selected from bead mills, ball mills, sand mills, paint shakers, ultrasonic homogenizers, and the like.

Dispersion processing using these dispersing means allows the infrared absorbing particles to be dispersed in a liquid medium and at the same time, atomization of the infrared absorbing particles by collision with each other progresses, enabling the infrared absorbing particles to be more finely particulate and dispersed. In other words, the pulverizing and dispersing process can be performed during the dispersing process.

Although the content of infrared absorbing particles in the infrared absorbing particle dispersion liquid described above is not particularly limited, the infrared absorbing particle dispersion liquid of the present embodiment preferably contains 0.001% by mass or more and 80.0% by mass or less of infrared absorbing particles. If the content is 0.001% by mass or more, it can be suitably used for the production of a coating layer, a plastic molding, or the like, which is one kind of an infrared absorbing particle dispersion material containing the infrared absorbing particles. If the content is 80.0% by mass or less, it can be easily produced industrially. The content of infrared absorbing particles in the infrared absorbing particle dispersion liquid is more preferably 0.01% by mass or more and 80.0% by mass or less, and even more preferably 1% by mass or more and 35% by mass or less.

When the visible light transmittance of the infrared absorbing particle dispersion liquid is 80%, the concentration of infrared absorbing particles in the infrared absorbing particle dispersion liquid is preferably 0.05% by mass or more and 0.20% by mass or less.

If the concentration of infrared absorbing particles in the infrared absorbing particle dispersion liquid is in the range of 0.05% by mass to 0.20% by mass when the visible light transmittance of the infrared absorbing particle dispersion liquid is 80%, near-infrared absorption properties are sufficient.

In the infrared absorbing particle dispersion liquid of the present embodiment, when the light transmittance of the liquid medium is set as the baseline and only the light absorption by the infrared absorbing particles is calculated, the color tone is preferably $b^* > 0$ in the $L^*a^*b^*$ color system. By satisfying the above range, it means that the infrared absorbing particles are pale blue.

The light transmittance of the infrared absorbing particle dispersion liquid of the present embodiment can be measured as a function of wavelength by placing the infrared absorbing particle dispersion liquid of the present embodiment in a suitable transparent container and using a spectrophotometer.

(3) Average Dispersion Particle Size

The characteristics of the infrared absorbing particle dispersion liquid of the present embodiment can be confirmed by measuring the dispersion state of infrared absorbing particles when the infrared absorbing particles are dispersed in a liquid medium. For example, by sampling the infrared absorbing particle dispersion liquid of the present embodiment and measuring the infrared absorbing particle dispersion liquid with various particle size distribution meters on the market, the state of infrared absorbing particles in the dispersion can be confirmed. As the particle size distribution meter, the particle size can be measured using, for example, DLS-8000 manufactured by Otsuka Electronics Co., Ltd., which is based on the dynamic light scattering method.

The particle size of infrared absorbing particles in the infrared absorbing particle dispersion liquid of the present embodiment can be selected according to the purpose of use of the infrared absorbing dispersion liquid or the like. The particle size is not particularly limited.

In the infrared absorbing particle dispersion liquid of the present embodiment, the average dispersion particle size of infrared absorbing particles is preferably, for example, in a range from 1 nm to 800 nm, and more preferably 1 nm to 400 nm. This is because if the average dispersion particle size is 800 nm or less, the infrared absorbing particles can exhibit strong infrared absorbing ability, and if the average dispersion particle size is 1 nm or more, industrial manufacturing is easy.

Especially, when the average dispersion particle size is 400 nm or less, it is possible to avoid that the infrared shielding film and the molded body (plates, sheets) become a grayish color with monotonically reduced transmittance. Moreover, if the average dispersion particle size is set to 400 nm or less, it is possible to suppress haze and enhance visible light transmittance especially when the infrared absorbing particle dispersion liquid is used as an infrared absorbing particle dispersion material or the like.

When the infrared absorbing particle dispersion liquid or the like is used for applications where transparency of light in the visible light region is particularly required, the infrared absorbing particles in the infrared absorbing particle dispersion liquid preferably have an average dispersion particle size of 40 nm or less. Here, the average dispersion particle size is set to 50% volume cumulative particle size measured using DLS-8000 manufactured by Otsuka Electronics Co., Ltd., which is based on the dynamic light scattering method. This is because, if the infrared absorbing particles have an average dispersion particle size smaller than 40 nm, scattering of light by Mie scattering and Rayleigh scattering of the infrared absorbing particles can be sufficiently suppressed to maintain high visibility of light in the visible light region, and at the same time, transparency can be efficiently maintained. When the infrared absorbing particles are used for applications where transparency is particularly required, such as windshields for automobiles, the average dispersion particle size of the infrared absorbing particles is more preferably 30 nm or less, and more preferably 25 nm or less, in order to further suppress scattering.

4. Infrared Absorbing Particle Dispersion Material

Next, an infrared absorbing particle dispersion material of the present embodiment will be described.

Figure 2:
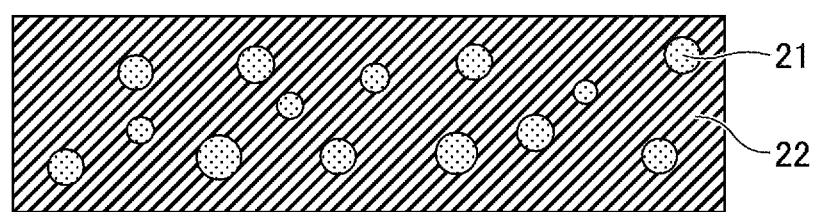
FIG. 2 is a schematic diagram of an infrared absorbing particle dispersion material.

The infrared absorbing particle dispersion liquid of the present embodiment may include a solid medium and the aforementioned infrared absorbing particles placed in the solid medium. Specifically, for example, as illustrated schematically in FIG. 2, the infrared absorbing particle dispersion liquid 20 may include the solid medium 22 and the aforementioned infrared absorbing particles 21, and the infrared absorbing particles 21 may be placed in the solid medium 22. The infrared absorbing particles 21 are preferably dispersed in the solid medium 22. FIG. 2 is a schematic view, and the infrared absorbing particle dispersion material of the present embodiment is not limited to the embodiment. For example, in FIG. 2, the infrared absorbing particles 21 are described as spherical particles, but the shape of the infrared absorbing particles 21 are not limited to the embodiment and can have any shape. The infrared absorbing particles 21 can also have a coating or the like on the surface, for example. In addition to the infrared absorbing particles 21 and the solid medium 22, the infrared absorbing particle dispersion material 20 can also contain other additives as needed.

(1) Components Contained

As described above, the infrared absorbing particle dispersion material of the present embodiment can contain a solid medium and the infrared absorbing particles described above. Since the infrared absorbing particles are described above, description thereof will be omitted. Hereinafter, a solid medium and components which can be contained in the infrared absorbing particle dispersion material as necessary will be described.

(1-1) Solid Medium

First, a solid medium which is a medium in a solid state will be described.

The solid medium is not particularly limited if it can be solidified in a state where infrared absorbing particles are dispersed. For example, an inorganic binder obtained by hydrolyzing a metal alkoxide or an organic binder such as a resin can be used.

In particular, the solid medium preferably contains a thermoplastic resin or a UV-curable resin (Ultra Violet curable resin). In the infrared absorbing particle dispersion material of the present embodiment, even if a medium is liquid state in the manufacturing process, if the medium eventually turns to a solid state, it is considered as a solid medium.

In the case where the solid medium includes a thermoplastic resin, the thermoplastic resin is not particularly limited and can be arbitrarily selected according to the required transmittance, strength, and the like. As the thermoplastic resin, one kind of resin selected from the resin groups consisting of, for example, polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene-vinyl acetate copolymer, and polyvinyl acetal resin, a mixture of two or more resins selected from the resin groups, or a copolymer of two or more resins selected from the resin groups can be preferably used.

On the other hand, when the solid medium contains a UV-curable resin, the UV-curable resin is not particularly limited and, for example, an acrylic UV-curable resin can be suitably used.

(1-2) Other Components

As described later in the manufacturing method of the infrared absorbing particle dispersion material, the infrared absorbing particle dispersion material may also contain a dispersant, a plasticizer, or the like.

(2) Content of Infrared Absorbing Particles

The content of infrared absorbing particles dispersed in the infrared absorbing particle dispersion material is not particularly limited, and can be arbitrarily selected according to the application and the like. The content of the infrared absorbing particles in the infrared absorbing particle dispersion material is preferably, for example, in the range from 0.001% by mass to 80.0% by mass, and more preferably in the range from 0.01° by mass to 70.0% by mass.

If the content of the infrared absorbing particles in the infrared absorbing particle dispersion material is 0.001% by mass or more, the thickness of the dispersion material for obtaining the required infrared absorbing effect of the infrared absorbing particle dispersion material can be suppressed. This increases the number of applications that can be used and facilitates transport.

In addition, if the content of infrared absorbing particles is set to 80.0% by mass or less, the content of solid medium can be secured in the infrared absorbing particle dispersion material, and the strength can be enhanced.

The content of infrared absorbing particles per unit projection area contained in the infrared absorbing particle dispersion material is preferably 0.04 g/m$^2$ or more and 10.0 g/m$^2$ or less. The term "content per unit projection area" means the weight (g) of infrared absorbing particles contained in the thickness direction of the infrared absorbing particle dispersion material of the present embodiment per unit area (m²) through which light passes.

If the content per unit projection area of the infrared absorbing particle dispersion material is set to the above range, the infrared absorbing effect can be kept high while maintaining the strength of the infrared absorbing particle dispersion material.

When only light absorption by infrared absorbing particles in the infrared absorbing particle dispersion material of the present embodiment is calculated, the color tone is preferably $b^*>0$ in the $L^*a^*b^*$ color system. Satisfying the above range signifies the pale blue infrared absorbing particles. The same applies to the infrared absorbing laminate transparent substrate and the infrared absorbing transparent substrate described later.

(3) Shape of Infrared Absorbing Particle Dispersion Material

The infrared absorbing particle dispersion material can be shaped into any shape depending on the application, and the shape is not particularly limited.

The infrared absorbing particle dispersion material is provided in a sheet shape, a board shape, or a film shape, and can be applied to various applications.

(4) Method of Manufacturing Infrared Absorbing Particle Dispersion Material

The method of manufacturing the infrared absorbing particle dispersion material of the present embodiment will now be described.

The infrared absorbing particle dispersion material can also be manufactured, for example, by mixing the above-mentioned solid medium with the aforementioned infrared absorbing particles, molding the mixture into a desired shape, and curing the mixture.

The infrared absorbing particle dispersion material can also be manufactured, for example, by using the aforementioned infrared absorbing dispersion liquid. In this case, infrared absorbing particle dispersion powder, a plasticizer dispersion, and a master batch described below can be manufactured first, and then the infrared absorbing particle dispersion material can be manufactured by using the infrared absorbing particle dispersion powder or the like. Details are described below.

First, a mixing step of mixing the aforementioned infrared absorbing particle dispersion liquid with a thermoplastic resin or a plasticizer can be performed. Next, a drying step for removing the solvent component (liquid medium component) derived from the infrared absorbing particle dispersion liquid can be performed.

By removing the solvent component, it is possible to obtain infrared absorbing particle dispersion powder (hereinafter referred to simply as "dispersion powder"), which is a dispersion having a high concentration of infrared absorbing particles dispersed in one or more materials selected from a thermoplastic resin and a dispersant derived from the infrared absorbing particle dispersion liquid, and a dispersion material (hereinafter referred to simply as "plasticizer dispersion") having a high concentration of infrared absorbing particles dispersed in the plasticizer.

The method of removing the solvent component from the mixture of the infrared absorbing particle dispersion liquid and the thermoplastic resin is not particularly limited, but it is preferable to use, for example, a method of drying the mixture of the infrared absorbing particle dispersion liquid and the thermoplastic resin under reduced pressure. Specifically, the mixture of the infrared absorbing particle dispersion liquid and the thermoplastic resin is dried under reduced pressure while stirring, and the dispersion powder or the plasticizer dispersion liquid and the solvent component are separated. The apparatus used for the drying under reduced pressure may be a vacuum stirring type dryer, but the apparatus having the above function is sufficient and not particularly limited. In addition, the pressure value at the time of the drying step under reduced pressure is not particularly limited and can be arbitrarily selected.

By using the reduced pressure drying method to remove the solvent component, the removal efficiency of the solvent from a mixture of the infrared absorbing particle dispersion liquid and the thermoplastic resin can be improved. In addition, when the reduced pressure drying method is used, since the infrared absorbing particle dispersion powder and the plasticizer dispersion liquid are not exposed to high temperature for a long time, aggregation of the infrared absorbing particles dispersed in the dispersion powder and the plasticizer dispersion liquid does not occur and is preferable. In addition, the productivity of the infrared absorbing particle dispersion powder and the plasticizer dispersion liquid is also improved, and it is easy to recover the evaporated solvent, which is also preferable from the viewpoint of environment.

In addition, as described above, a master batch can be used in the manufacturing of the infrared absorbing particle dispersion material.

For example, the master batch can be manufactured by dispersing the infrared absorbing particle dispersion liquid or the infrared absorbing particle dispersion powder in a resin and pelleting the resin.

Another method of manufacturing the master batch is to first uniformly mix the infrared absorbing particle dispersion liquid or the infrared absorbing particle dispersion powder with the thermoplastic resin powder or pellets and other additives as needed. The mixture can also be produced by kneading it with a vented uniaxial or twin-screw extruder and processing it into pellets by a general method of cutting the melt extruded strands. In this case, the shape can be cylindrical or prismatic. It is also possible to use the so-called hot-cutting method to directly cut the melt extruded product. In this case, it is common to cut into a shape close to a sphere.

By the above procedure, the infrared absorbing particle dispersion powder, the plasticizer dispersion, and the master batch can be produced.

The infrared absorbing particle dispersion material of the present embodiment can be produced by uniformly mixing the infrared absorbing particle dispersion powder, the plasticizer dispersion, or the master batch in the solid medium and molding it into a desired shape. As described above, an inorganic binder or an organic binder such as a resin can be used as the solid medium. In particular, a thermoplastic resin or a UV-curable resin can be preferably used as the binder. Since the thermoplastic resin and the UV-curable resin which can be particularly suitably used have been described above, the description will be omitted here.

When a thermoplastic resin is used as a solid medium, infrared absorbing particle dispersion powder, a plasticizer dispersion or a master batch, a thermoplastic resin and a plasticizer or other additive can be first kneaded as desired. The kneaded material can then be molded by various molding methods such as extrusion molding, injection molding, calender roll, extrusion, casting, and inflation to produce, for example, a sheet-like infrared absorbing particle dispersion molded in a planar or curved shape.

In the case where an infrared absorbing particle dispersion material using a thermoplastic resin is used as a solid medium, for example, as an intermediate layer arranged between transparent substrates or the like, and the thermoplastic resin contained in the infrared absorbing particle dispersion material does not have sufficient flexibility or adhesion to transparent substrates or the like, a plasticizer can be added to the infrared absorbing particle dispersion material when producing the infrared absorbing particle dispersion material. Specifically, in the case where the thermoplastic resin is polyvinyl acetal resin, for example, it is preferable to add a plasticizer.

The plasticizer to be added is not particularly limited, but can be used as long as the material can function as a plasticizer for the thermoplastic resin to be used. For example, when polyvinyl acetal resin is used as the thermoplastic resin, a plasticizer which is a compound of a mono-hydric alcohol and an organic acid ester, an ester-based plasticizer such as a polyhydric alcohol organic acid ester compound, a phosphoric acid plasticizer such as an organophosphate plasticizer, and the like can be preferably used as the plasticizer.

Since the plasticizer is preferably liquid at room temperature, an ester compound synthesized from a polyhydric alcohol and a fatty acid is preferably used.

As described above, the infrared absorbing particle dispersion material of the present embodiment is provided in any shape, for example, a sheet shape, a board shape, or a film shape.

5. Transparent Substrate for Infrared Absorbing Laminate

Next, a configuration example of an infrared absorbing laminate transparent substrate of the present embodiment will be described.

The infrared absorbing laminate transparent substrate of the present embodiment may have a plurality of transparent substrates and an infrared absorbing particle dispersion material of the present embodiment. The infrared absorbing particle dispersion material may have a laminated structure arranged between the plurality of transparent substrates.

Figure 3:
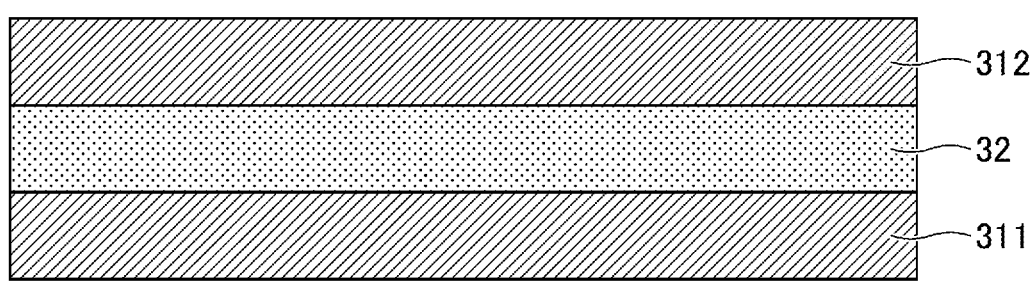
FIG. 3 is a cross-sectional schematic diagram of an infrared absorbing laminate transparent substrate.

Specifically, as illustrated in FIG. 3, which is a cross-sectional schematic diagram along the laminate direction of the transparent substrate and the infrared absorbing particle dispersion material, the infrared absorbing laminate transparent substrate 30 may have the plurality of transparent substrates 311 and 312 and the infrared absorbing particle dispersion material 32. The infrared absorbing particle dispersion material 32 can be arranged between the plurality of transparent substrates 311 and 312. In FIG. 3, an example having two transparent substrates 311 and 312 is illustrated, but it is not limited to the embodiment.

The infrared absorbing laminate transparent substrate of the present embodiment may have a structure in which the infrared absorbing particle dispersion material which is an intermediate layer is sandwiched by using the transparent substrate (transparent substrate) from both sides of the infrared absorbing particle dispersion material.

The transparent substrate is not particularly limited and can be arbitrarily selected in consideration of visible light transmittance and the like. For example, as the transparent substrate, one or more kinds selected from glass plates, plastic plates, plastic boards, plastic films, and the like, can be used. The transparent substrate is preferably transparent in the visible light region.

When a transparent substrate made of plastic is used, the material of the plastic is not particularly limited but can be selected according to the application. Examples of the materials include polycarbonate resin, acrylic resin, polyethylene terephthalate resin, polyamide resin, vinyl chloride resin, olefin resin, epoxy resin, polyimide resin, fluororesin, and the like.

It should be noted that, although two or more transparent substrates may be used for the infrared absorbing laminate transparent substrate of the present embodiment, when two or more transparent substrates are used, for example, transparent substrates made of different materials may be used in combination. Furthermore, the thickness of the transparent substrates need not be the same, and transparent substrates having different thicknesses may be used in combination.

In the infrared absorbing laminate transparent substrate of the present embodiment, the above-mentioned infrared absorbing particle dispersion material may be used as an intermediate layer. Since the infrared absorbing particle dispersion material has already been described, the description will be omitted here.

Although the infrared absorbing particle dispersion material used for the infrared absorbing laminate transparent substrate of the present embodiment is not particularly limited, it can be preferably provided in a sheet shape, a board shape, or a film shape.

The infrared absorbing laminate transparent substrate of the present embodiment can be manufactured by laminating and integrating a plurality of opposing transparent substrates in which the infrared absorbing particle dispersion material formed in a sheet shape or the like is sandwiched.

In the case where the infrared absorbing laminate transparent substrate includes three or more transparent substrates, there are two or more locations between the transparent substrates, but it is not necessary to arrange the infrared absorbing particle dispersion material between all the transparent substrates, and it is possible to arrange the infrared absorbing particle dispersion material in at least one location.

6. Infrared Absorbing Transparent Substrate

Figure 4:
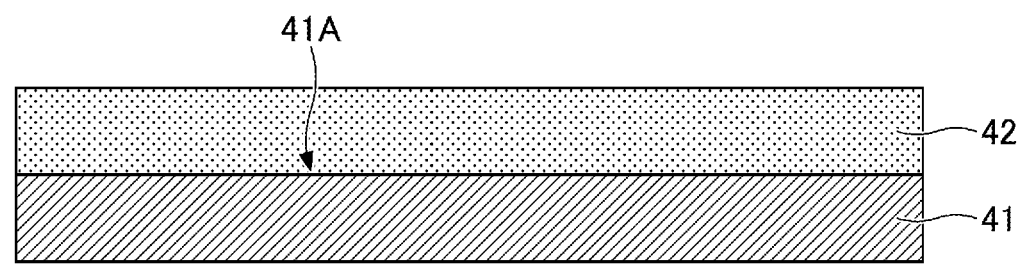
FIG. 4 is a cross-sectional schematic diagram of an infrared absorbing transparent substrate.

The infrared absorbing transparent substrate of the present embodiment may include a transparent substrate and an infrared absorbing layer arranged on at least one surface of the transparent substrate. The infrared absorbing layer may be the infrared absorbing particle dispersion material described above. Specifically, as illustrated in FIG. 4, which is a cross-sectional schematic diagram along the laminate direction of the transparent substrate and the infrared absorbing layer, an infrared absorbing transparent substrate 40 may have a transparent substrate 41 and an infrared absorbing layer 42. The infrared absorbing layer 42 may be disposed on at least one surface 41A of the transparent substrate 41.

The method of manufacturing the infrared absorbing transparent substrate is not particularly limited. For example, a coating layer which is an infrared absorbing layer containing infrared absorbing particles can be formed on a transparent substrate (transparent substrate) selected from a film substrate and a glass substrate by using the infrared absorbing particle dispersion liquid described above. An infrared absorbing film or an infrared absorbing glass which is an infrared absorbing transparent substrate can be produced by the above steps.

The coating layer can be produced by using, for example, a coating liquid obtained by mixing the above-described infrared absorbing particle dispersion liquid and plastic or monomer.

For example, an infrared absorbing film can be produced as follows.

A medium resin which becomes a solid medium after curing is added to the above infrared absorbing particle dispersion liquid to obtain a coating liquid.

After the coating liquid is coated on the surface of the film substrate, the liquid medium contained in the coating liquid is evaporated. By curing the medium resin in a manner corresponding to the used medium resin, a coating layer (coating film) in which the infrared absorbing particles are dispersed in the solid medium can be formed to form an infrared absorbing film.

By using the transparent substrate as a glass substrate, infrared absorbing glass can be similarly produced.

The medium resin of the coating layer can be selected from, for example, a UV curable resin, a thermosetting resin, an electron beam curable resin, a room temperature curable resin, a thermoplastic resin or the like according to the purpose. Examples of the medium resin include polyethylene resin, polyvinyl chloride resin, polyvinylidene chloride resin, polyvinyl alcohol resin, polystyrene resin, polypropylene resin, ethylene vinyl acetate copolymer, polyester resin, polyethylene terephthalate resin, fluororesin, polycarbonate resin, acrylic resin, polyvinyl butyral resin, and the like.

These medium resins may be used alone or in combination. However, among the medium resins for the coating layer, it is particularly preferable to use a UV-curable resin binder from the viewpoint of productivity and equipment cost.

It is also possible to use a binder using a metal alkoxide. A typical metal alkoxide is an alkoxide such as Si, Ti, Al, Zr, and the like. These metal alkoxide binders can be hydrolyzed and condensation polymerized by heating or other means to form a coating layer in which the solid medium consists of an oxide film.

Examples of the materials of the film substrate described above include polyester resin, acrylic resin, urethane resin, polycarbonate resin, polyethylene resin, ethylene vinyl acetate copolymer, vinyl chloride resin, fluororesin, and the like, and these can be used for various purposes. The film substrate of the infrared absorbing film is preferably polyester film, and polyethylene terephthalate (PET) film is more preferred. The film substrate means a substrate made of plastic which is a synthetic resin, and the thickness and shape of the film substrate are not limited.

In addition, in order to realize easy adhesion of the coating layer to the film substrate, the surface of the film substrate is preferably surface-treated. In order to improve the adhesiveness between the glass substrate or the film substrate and the coating layer, an intermediate layer is formed on the glass substrate or the film substrate and a coating layer is formed on the intermediate layer. The structure of the intermediate layer is not particularly limited, and can be composed of, for example, a polymer film, a metal layer, an inorganic layer (for example, inorganic oxide layers such as silica, titania, zirconia, and the like), an organic/inorganic composite layer, or the like.

The method of applying the coating liquid containing the infrared absorbing particle dispersion liquid or the like to provide the coating layer on the film substrate or the glass substrate may be a method for uniformly applying the coating liquid containing the infrared absorbing particle dispersion liquid or the like to the surface of the substrate, and the method is not particularly limited. For example, a bar coating method, a gravure coating method, a spray coating method, a dip coating method, and the like may be used.

For example, in the case of a bar coating method using a UV-curable resin, an infrared-absorbing transparent substrate can be prepared as follows.

A coating film can be formed on a film substrate or a glass substrate by a wire bar with a bar number selected according to the thickness of the coating layer and the content of infrared absorbing particles by using a coating liquid with liquid concentration adjusted to have moderate leveling properties and additives added as needed. Then, the liquid media contained in the coating liquid is removed by drying, and the solid media is cured by irradiating with ultraviolet light to form a coating layer on the film substrate or the glass substrate. At this time, the drying condition of the coating film varies depending on each component, the type of the liquid medium and the percentage of use, but the drying is usually performed at a temperature of 60° C. to 140° C. for 20 seconds to 10 minutes. There is no particular limitation on the irradiation of ultraviolet rays, and a UV exposure device such as an ultra-high-pressure mercury lamp can be suitably used.

In addition, adhesion between the transparent substrate and the coating layer, smoothness of the coating film during coating, and drying of the organic solvent can also be adjusted in the process before or after the formation of the coating layer. The pre-process includes, for example, a surface treatment process for transparent substrates and a pre-bake (pre-heating of substrates) process, while the post-process includes a post-bake (post-heating of substrates) process, which can be selected as appropriate. The heating temperature in the pre-bake process and the post-bake process is preferably in a range from 80° C. to 200° C., and the heating time is preferably in a range from 30 seconds to 240 seconds.

The thickness of the coating layer on the film substrate or the glass substrate is not particularly limited, but in practical use the thickness is preferably 10 μm or less, and more preferably 6 μm or less. This is because if the thickness of the coating layer is 10 μm or less, in addition to sufficient pencil hardness and abrasion resistance, warping of the film substrate can be prevented during volatilization of the liquid medium and curing of the solid medium in the coating layer.

The content of infrared absorbing particles in the coating layer is not particularly limited, but the content per projected area of the coating layer is 0.1 $g/m^2$ or more and 10.0 $g/m^2$ or less. This is because, if the content per projected area is 0.1 $g/m^2$ or more, infrared absorbing particles can exhibit particularly high infrared absorbing properties.

Further, if the content per projected area is 10.0 $g/m^2$ or less, the visible light transmission of the infrared absorbing transparent substrate can be sufficiently maintained.

In addition, in order to further impart the ultraviolet absorbing function to the infrared absorbing film and the infrared absorbing glass which are the infrared absorbing transparent substrates of the present embodiment, at least one or more inorganic particles such as titanium dioxide, zinc oxide, cerium oxide, and the like, or organic particles such as benzophenone or benzotriazole may be added to the coating layer.

7. Physical Properties

Although the infrared absorbing particle dispersion liquid, the infrared absorbing particle dispersion material, the infrared absorbing laminate transparent substrate, and the infrared absorbing transparent substrate (collectively referred to as "infrared absorbing particle dispersion liquid and the like") have been described, the optical properties of infrared absorbing particle dispersion liquid and the like can be selected according to the application and the like, and are not particularly limited.

The light transmittance of the infrared absorbing particle dispersion liquid and the like at a wavelength of 850 nm is preferably 30% or higher, and more preferably 35% or higher. This is because by setting the light transmittance at a wavelength of 850 nm to 30% or higher, the transmittance of signals of mobile phones and various sensors can be enhanced.

The visible light transmittance of the infrared absorbing particle dispersion liquid and the like is preferably 70% or higher. This is because, by setting the visible light transmittance to 70% or higher, it means that transparency to visible light is excellent, and visibility can be sufficiently high even when the infrared absorbing particle dispersion liquid and the like is used for a window glass or the like of automobiles.

The solar transmittance of the infrared absorbing particle dispersion liquid and the like is preferably 65% or lower, and more preferably 60% or lower. This is because the penetration of infrared radiation into a room or the like can be sufficiently suppressed by setting the solar transmittance to 65% or lower.

Furthermore, the light transmittance of the infrared absorbing particle dispersion liquid and the like is preferably 25% or lower at a wavelength of 1550 nm from the viewpoint of effectively suppressing a sizzle-like feeling.

The haze value of the infrared absorbing particle dispersion liquid and the like is preferably 2% or lower and more preferably 1% or lower. If the haze value is set to 2% or lower, fogging is suppressed, and the visibility can be enhanced when used for window glass or the like.

The infrared absorbing particles, the infrared absorbing particle dispersion liquid, the infrared absorbing particle dispersion material, the infrared absorbing laminate transparent substrate, and the infrared absorbing transparent substrate of the present embodiment can be used for various applications, and the applications are not particularly limited. For example, these can be used for window materials such as vehicles, buildings, offices, general residences, and the like; single-pane glass used for telephone booths, show windows, lamps for lighting, transparent cases, and the like; laminate glass; plastics; fibers; and other broad fields that require infrared absorbing functions.

EXAMPLES

Hereinafter, the present invention will be described in detail with examples. However, the present invention is not limited to the following examples.

First, a method of evaluating a sample in the following Examples and Comparative Examples will be described.

(1) Chemical Analysis

Chemical analysis of composite tungsten oxide particles containing infrared absorbing particles obtained was performed by atomic absorption spectrometry (AAS) for Cs and ICP optical emission spectrometry (ICP-OES) for W. Oxygen was analyzed by melting the sample in He gas with a light element analyzer (model: ON-836, manufactured by LECO), and CO gas produced by the reaction with carbon in an analytical crucible was determined by IR absorption spectroscopy.

(2) Crystal Structure and Lattice Constant

Crystal structure and lattice constant of composite tungsten oxide particles containing infrared absorbing particles obtained in the following Examples and Comparative Examples were measured and calculated.

First, the X-ray diffraction pattern of the infrared absorbing particles was measured by the powder X-ray diffraction method ($\theta$-2$\theta$ method) using a powder X-ray diffractometer (X'Pert-PRO/MPD, manufactured by PANalytical, Spectris Co., Ltd.). The crystal structure of the composite tungsten oxide particles contained in the particles was identified from the obtained X-ray diffraction pattern, and the lattice constant was calculated by Rietveld analysis. The external standard method was adopted for Rietveld analysis. The Rietveld analysis of the X-ray diffraction pattern of Si standard powder (NIST640c) measured at the same time was first carried out, and the zero shift value and the half value width parameter obtained at the time were determined as the equipment parameters, and the Rietveld analysis of the composite tungsten oxide particles was made accurate.

(3) Spectral Transmittance of Infrared Absorbing Particle Dispersion Liquid and Color System In the following Examples and Comparative Examples, the transmittance of the infrared absorbing particle dispersion liquid was measured using a spectrophotometer U-4100, manufactured by Hitachi, Ltd., while holding the dispersion liquid in a spectrophotometer cell (Model number: S10-SQ-1, Material: Synthetic quartz, Optical path length: 1 mm, manufactured by GL Sciences Inc.).

At the time of the measurement, the transmittance was measured while the liquid medium (methyl isobutyl ketone or the like, hereinafter refers to as MIBK) of the dispersion liquid was filled in the cell described above, and the baseline of the transmittance measurement was determined. As a result, in the spectral transmittance and visible light transmittance described below, light reflection on the surface of the spectrophotometer cell and light absorption by the liquid medium are excluded, and only light absorption by the infrared absorbing particles is calculated.

For the visible light transmittance and solar transmittance, the transmitted light profile was measured at intervals of 5 nm in the wavelength range from 200 nm to 2600 nm, and was calculated in the wavelength range from 300 nm to 2100 nm based on JIS A 5759(2016).

The values of L*, a*, b* were measured using the L*a*b* color system (D65 light source/10-degree field of view) based on JIS Z 8701(1999). (4) Spectral Transmittance of Infrared Absorbing Transparent Substrate, Infrared Absorbing Laminate Transparent Substrate, and color System The transmittance of the infrared absorbing transparent substrate and the infrared absorbing laminate transparent substrate was also measured using a spectrophotometer U-4100, manufactured by Hitachi, Ltd. The solar transmittance and visible light transmittance were measured and calculated under the same conditions as those for the evaluation before and after the following heat resistance test and the like. The light transmittance at the wavelength of 850 nm was measured for the infrared absorbing laminate transparent substrate.

The values of L, a*, b* were measured using the L*a*b* color system (D65 light source/10-degree field of view) based on JIS Z 8701(1999).

Transmitted light profiles were measured at intervals of 5 nm in the wavelength range from 200 nm to 2600 nm for the infrared absorbing transparent substrate before and after the heat resistance and wet heat resistance tests described below, and the visible light transmittance and solar transmittance were calculated in the wavelength range from 300 nm to 2100 nm based on JIS A 5759(2016). For the heat resistance and wet heat resistance tests, samples cut from the infrared absorbing transparent substrate prepared in each Example and Comparison Example were used for each test.

For the infrared absorbing laminate transparent substrate, heat resistance and wet heat resistance tests were performed in the same manner, and the solar transmittance before and after the heat resistance and wet heat resistance tests were calculated. For the infrared absorbing laminate transparent substrate, samples for spectral transmittance, heat resistance, and wet heat resistance tests were prepared separately for each Example and Comparison Example, and each evaluation was performed.

(5) Evaluation of Heat Resistance

The infrared absorbing transparent substrate was kept at 120° C. in air for 125 hours, and the changes in visible light transmittance and solar transmittance before and after exposure to the above atmosphere were evaluated. The infrared absorbing transparent substrate whose amount of change in solar transmittance before and after exposure was 1.0% or lower was evaluated as good in heat resistance, and the substrate whose amount of change was more than 1.0% was evaluated as lacking heat resistance.

The infrared absorbing laminate transparent substrate was also evaluated for heat resistance under the same conditions.

(6) Evaluation of Wet Heat Resistance

The infrared absorbing transparent substrate was kept in an atmosphere of 85° C. and 95% humidity for 94 hours, and the changes in visible light transmittance and solar transmittance before and after exposure to the above atmosphere were evaluated. In the infrared absorbing transparent substrates, those whose amount of change in solar transmittance before and after exposure was lower than 2.0% were evaluated as good in wet heat resistance, and those whose amount of change was 2.0% or higher were evaluated as lacking wet heat resistance.

The evaluation of wet heat resistance was also performed under the same condition for the infrared absorbing laminate transparent substrate.

The preparation conditions of the samples of Examples and Comparative Examples will be described below.

Example 1

(1) Preparation of Infrared Absorbing Particles

Each powder of tungstic acid ($H_2WO_4$) and cesium carbonate ($Cs_2CO_3$) was weighed at a ratio equivalent to Cs/W (molar ratio)=0.29/1.00, and mixed thoroughly with a grinding machine to make a mixed powder (mixing step).

The mixed powder was subjected to reduction treatment at 570° C. for 1 hour under supplying 3% by volume of $H_2$ gas using $N_2$ gas as a carrier (second heat treatment process).

The mixture was then fired at 820° C. for 0.5 hours under supplying 1% by volume of compressed air using $N_2$ gas as a carrier (first heat treatment process, first step), and further fired at 820° C. for 0.5 hours under $N_2$ gas atmosphere (first heat treatment process, second step).

By the above process, infrared absorbing particles consisting of particles of cesium tungsten bronze having a hexagonal crystal, that is, cesium tungsten oxide, (hereinafter abbreviated as "Powder Al") were obtained.

As a result of chemical analysis of Powder Al, Cs/W (molar ratio) was 0.29/1. The composition ratios of the other components are indicated in Table 1 in the column of Chemical Analysis Composition Ratio. The crystal structure and lattice constant of cesium tungsten oxide particles, which are composite tungsten oxide particles, are indicated in Table 1.

(2) Infrared Absorbing Particle Dispersion Liquid 23.0% by mass of Powder Al, 18.4% by mass of acrylic polymer dispersant having a group containing amine as a functional group (acrylic dispersant with amine value of 48 mgKOH/g and decomposition temperature of 250° C.), and 58.6% by mass of MIBK as a liquid medium were weighed. These were loaded into a paint shaker containing $ZrO_2$ beads with 0.3 mm φ, and pulverized and dispersed for 4 hours to obtain an infrared absorbing particle dispersion liquid (hereinafter abbreviated as "Dispersion B1").

The obtained Dispersion B1 was suitably diluted with MIBK so that the visible light transmittance was to be 80% and placed in a spectrophotometer cell, and the spectral transmittance was measured. The concentration of infrared absorbing particles at this time is indicated in Table 2 as the concentration of infrared absorbing particles. The color system was measured from the transmitted light profile when the dilution ratio was adjusted so that the visible light transmittance was to be 80%. The solar transmittance and the evaluation results of the color system are indicated in Table 2.

(3) Infrared Absorbing Transparent Substrate

Infrared absorbing glass and an infrared absorbing film were prepared by the following procedure and evaluated. The Infrared absorbing glass and the infrared absorbing film are examples of infrared absorbing transparent substrate, and a coating layer which is an infrared absorbing layer (infrared absorbing particle layer) is an infrared absorbing particle dispersion material.

(3-1) Preparation of Infrared Absorbing Glass

100% by mass of the obtained Dispersion B1 was mixed with 50% by mass of Aronix UV-3701 (hereinafter referred to as UV-3701), an ultraviolet curable resin for hard coat, manufactured by TOAGOSEI CO., Ltd., to form an infrared absorbing particle coating liquid (hereinafter referred to as "Coating Liquid C1"). Coating Liquid C1 was applied onto a blue-plate glass with a thickness of 3 mm (HPE-50, manufactured by TEIJIN Limited) using a bar coater (No. 16) to form a coating film. In other Examples and Comparative Examples, the same type of glass was used when the infrared absorbing glass was manufactured.

The glass with the coating film was dried at 70° C. for 60 seconds to evaporate the solvent as the liquid medium, and then cured with a high-pressure mercury lamp. As a result, infrared absorbing glass in which a coating layer containing infrared absorbing particles was provided on one surface of the glass substrate was produced.

(3-2) Preparation of Infrared Absorbing Film

Furthermore, Coating Liquid C1 was applied onto a PET film substrate with a thickness of 50 μm using a bar coater (No. 8) to form a coating film. In other Examples and Comparative Examples, the same PET film was used when producing the infrared absorbing film.

The PET film with the coating film was dried at 70° C. for 60 seconds to evaporate the solvent as the liquid medium, and then cured with a high-pressure mercury lamp. As a result, an infrared absorbing film in which a coating layer containing infrared absorbing particles was provided on one surface of the PET film substrate was produced.

The optical properties of the obtained infrared absorbing transparent substrate were evaluated. The evaluation results are indicated in Table 3. In Table 3, when the type of the substrate is glass, the evaluation result is infrared absorbing glass, and when the type of the substrate is PET, the evaluation result is an infrared absorbing film.

(3-3) Evaluation of Heat Resistance and Wet Heat Resistance

The heat resistance of the infrared absorbing glass of Example 1 and the wet heat resistance of the infrared absorbing film were evaluated.

(3-3-1) Evaluation of Heat Resistance

The visible light transmittance and solar transmittance before and after exposure in the infrared absorbing glass of Example 1 were evaluated.

The evaluation results are indicated in Table 4.

(3-3-2) Evaluation of Wet Heat Resistance

The visible light transmittance and solar transmittance before and after exposure in the infrared absorbing film of Example 1 were evaluated.

The evaluation results are shown in Table 5.

(4) Infrared Absorbing Laminate Transparent Substrate

Further, a dispersant a was added to Dispersion B1 which is the infrared absorbing particle dispersion liquid according to Example 1, and the mass ratio of the dispersant a to the infrared absorbing particles was adjusted to be [dispersant a/infrared absorbing particles]=3. Next, methyl isobutyl ketone was removed from the prepared dispersion liquid using a spray dryer to obtain an infrared absorbing particle dispersion powder (hereinafter referred to as "Dispersion Powder").

A composition for producing an infrared absorbing sheet is prepared by adding a predetermined amount of dispersion powder to a polycarbonate resin which is a thermoplastic resin so that the visible light transmittance of the infrared absorbing sheet (a thickness of 1.0 mm) produced is 80%. The composition for producing the infrared absorbing sheet is kneaded at 280° C. using a twin-screw extruder, extruded from a T-die, and made into a sheet material with a thickness of 1.0 mm by a calendar roll method to obtain the infrared absorbing sheet of Example 1. The infrared absorbing sheet is an example of an infrared absorbing particle dispersion material.

The obtained infrared absorbing sheet was sandwiched between two green glass substrates with a size of 100 mm×100 mm×a thickness of about 2 mm, heated to 80° C., and temporarily bonded. Then, the infrared absorbing laminate transparent substrate was prepared by completely bonding the sheet and the substrates with an autoclave under the condition of 140° C. and 14 kg/cm$^2$.

The optical properties, heat resistance, and wet heat resistance of the resulting infrared absorbing laminate transparent substrate were evaluated. The evaluation results are indicated in Tables 6, 7, and 8.

Example 2

When the infrared absorbing particle dispersion liquid was prepared, the time for pulverization and dispersion was set to 10 hours. In Example 2, Powder A2, Dispersion Liquid B2, the infrared absorbing glass, and the infrared absorbing laminate transparent substrate were obtained in the same manner as in Example 1 except for the above. The evaluation results are indicated in Tables 1 to 3 and 6.

Example 3

Tungstic acid ($H_2WO_4$) and cesium carbonate ($Cs_2CO_3$) powders were weighed and mixed at a ratio equivalent to Cs/W (molar ratio)=0.27/1.00 (mixing step).

The mixed powder was subjected to reduction treatment at 570° C. for 1 hour under supplying 5% by volume of $H_2$ gas using $N_2$ gas as a carrier (second heat treatment process).

Then, the mixed powder was heated under supplying a 1% by volume of compressed air using $N_2$ gas as a carrier and fired at 820° C. for 0.5 hours (first heat treatment process, first step).

Further, the mixed powder was fired under $N_2$ gas atmosphere at a temperature of 820° C. for 0.5 hours (first heat treatment process, second step). The time of pulverization and dispersion was set to 8 hours.

In Example 3, Powder A3, Dispersion Liquid B3, the infrared absorbing glass, the infrared absorbing film, and the infrared absorbing laminate transparent substrate were produced and evaluated in the same manner as in Example 1 except that the conditions of the mixing step and the heat treatment process in the production of the infrared absorbing particles and the time of pulverization and dispersion in the preparation of the infrared absorbing particle dispersion liquid were changed. The evaluation results are indicated in Tables 1 to 8.

In Examples 4 to 15 and Comparative Examples 1 to 6 described below, some or all of the conditions of the mixing step and the heat treatment process in the production of the infrared absorbing particles and the time of the pulverization and dispersion in the preparation of the infrared absorbing particle dispersion liquid are also changed in the following points.

Figure 5:
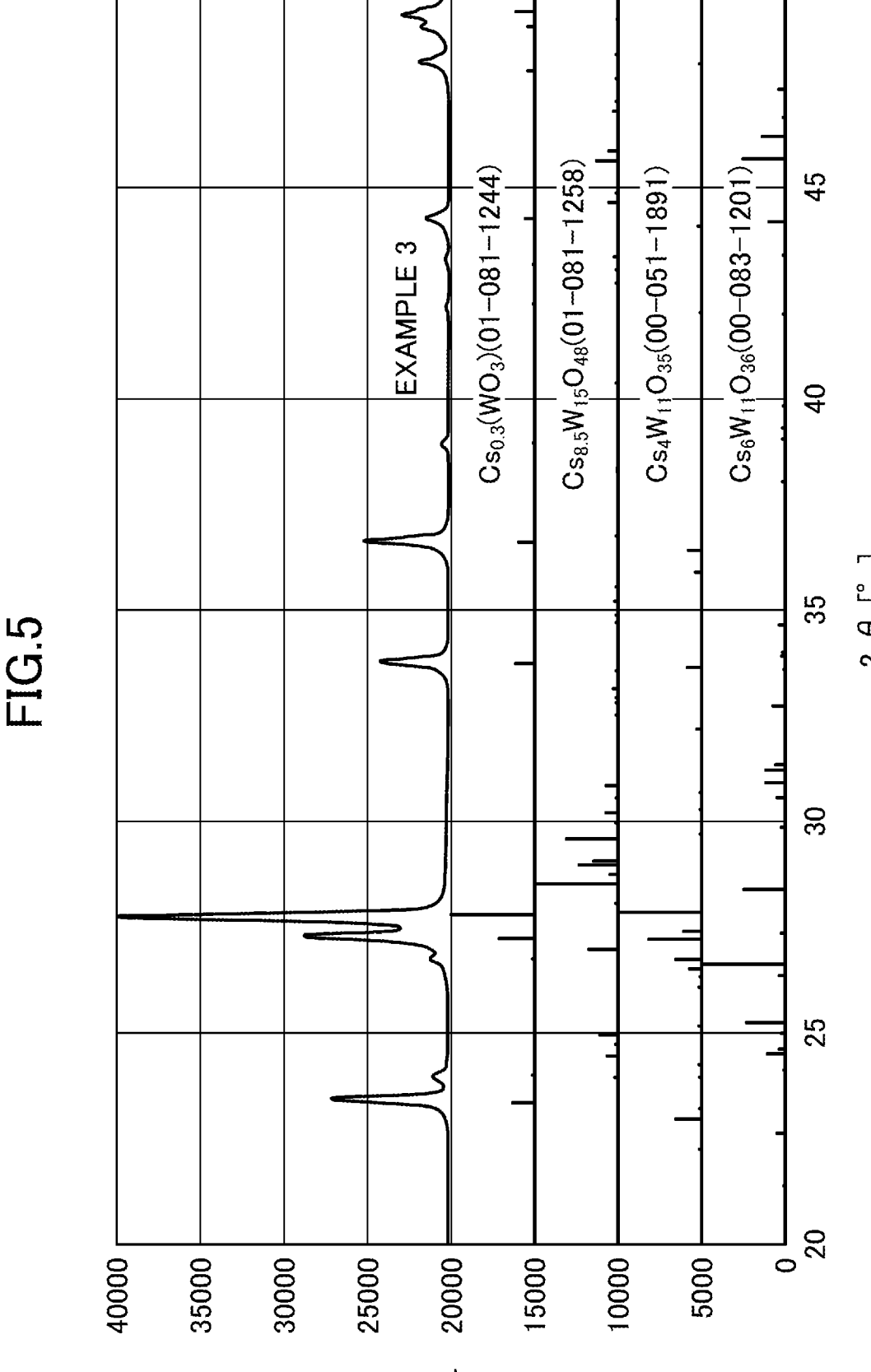
FIG. 5 is an XRD pattern of infrared absorbing particles obtained in Example 3.

The X-ray diffraction pattern of the obtained Powder A3 is illustrated in FIG. 5. As illustrated in FIG. 5, Powder A3 is identified as a hexagonal $Cs_{0.3}(WO_3)$ (TCDD 01-081-1244) single phase and is infrared absorbing particles consisting of hexagonal cesium tungsten oxide particles.

Example 4

In preparing the infrared absorbing particles, the mixed powder was heated under supplying 1% by volume of compressed air using $N_2$ gas as a carrier and fired at a temperature of 820° C. for 0.5 hours (first heat treatment process). Next, the mixed powder was heated under supplying 5% by volume of $H_2$ gas using $N_2$ gas as a carrier and fired at a temperature of 570° C. for 1 hour (second heat treatment process, first step). In addition, the mixed powder was fired under $N_2$ gas atmosphere at a temperature of 820° C. for 0.5 hours (second heat treatment process, second step).

When the infrared absorbing particle dispersion liquid was prepared, the time of pulverization and dispersion was set to 8 hours.

In Example 4, Powder A4, Dispersion Liquid B4, the infrared absorbing glass, and the infrared absorbing laminate transparent substrate were produced and evaluated in the same manner as in Example 1 except the above operation.

As illustrated in Table 1, Powder A4 is the infrared absorbing particles consisting of composite tungsten oxide particles having a hexagonal crystal structure.

The evaluation results are indicated in Tables 1 to 3 and Table 6.

Example 5

Tungstic acid ($H_2WO_4$) and cesium carbonate ($Cs_2CO_3$) powders were weighed and mixed at a ratio equivalent to Cs/W (molar ratio)=0.33/1.00 (mixing step).

The mixed powder was subjected to reduction treatment at 570° C. for 1 hour under supplying 5% by volume of $H_2$ gas using $N_2$ gas as a carrier (second heat treatment process).

Next, the mixed powder was heated under supplying 1% by volume of compressed air using $N_2$ gas as a carrier and fired at a temperature of 820° C. for 0.5 hours (first heat treatment process, first step). In addition, the mixed powder was fired under $N_2$ gas atmosphere at a temperature of 820° C. for 0.5 hours (first heat treatment process, second step).

When the infrared absorbing particle dispersion liquid was prepared, the time of pulverization and dispersion was set to 5 hours.

In Example 5, Powder A5, Dispersion Liquid B5, and the infrared absorbing laminate transparent substrate were produced and evaluated in the same manner as in Example 1 except for the above.

As indicated in Table 1, Powder A5 is infrared absorbing particles consisting of composite tungsten oxide particles having a hexagonal crystal structure.

The evaluation results are indicated in Tables 1, 2 and 6.

Example 6

Tungstic acid ($H_2WO_4$) and cesium carbonate ($Cs_2CO_3$) powders were weighed and mixed at a ratio equivalent to Cs/W (molar ratio)=0.32/1.00 (mixing step).

The mixed powder was subjected to reduction treatment at 570° C. for 1 hour under supplying 5% by volume of $H_2$ gas using $N_2$ gas as a carrier (second heat treatment process).

Next, the mixed powder was heated under supplying 1% by volume of compressed air using $N_2$ gas as a carrier and fired at a temperature of 820° C. for 0.5 hours (first heat treatment process, first step). In addition, the mixed powder was fired under $N_2$ gas atmosphere at a temperature of 820° C. for 0.5 hours (first heat treatment process, second step).

When the infrared absorbing particle dispersion liquid was prepared, the time of pulverization and dispersion was set to 5 hours.

In Example 6, Powder A6, Dispersion Liquid B6, and the infrared absorbing laminate transparent substrate were produced and evaluated in the same manner as in Example 1 except for the above.

As indicated in Table 1, Powder A6 is infrared absorbing particles consisting of composite tungsten oxide particles having a hexagonal crystal structure.

The evaluation results are indicated in Tables 1, 2 and 6.

Example 7

Tungstic acid ($H_2WO_4$) and cesium carbonate ($Cs_2CO_3$) powders were weighed and mixed at a ratio equivalent to Cs/W (molar ratio)=0.31/1.00 (mixing step).

The mixed powder was subjected to reduction treatment at 570° C. for 1 hour under supplying 5% by volume of $H_2$ gas using $N_2$ gas as a carrier (second heat treatment process).

Next, the mixed powder was heated under supplying 1% by volume of compressed air using $N_2$ gas as a carrier and fired at a temperature of 820° C. for 0.5 hours (first heat treatment process, first step). In addition, the mixed powder was fired under $N_2$ gas atmosphere at a temperature of 820° C. for 0.5 hours (first heat treatment process, second step).

When the infrared absorbing particle dispersion liquid was prepared, the time of pulverization and dispersion was set to 5 hours.

In Example 7, Powder A7, Dispersion Liquid B7, and the infrared absorbing laminate transparent substrate were produced and evaluated in the same manner as in Example 1 except for the above.

As indicated in Table 1, Powder A7 is infrared absorbing particles consisting of composite tungsten oxide particles having a hexagonal crystal structure.

The evaluation results are indicated in Tables 1, 2, and 6.

Example 8

Tungstic acid ($H_2WO_4$) and cesium carbonate ($Cs_2CO_3$) powders were weighed and mixed at a ratio equivalent to Cs/W (molar ratio)=0.30/1.00 (mixing step).

The mixed powder was subjected to reduction treatment at 570° C. for 1 hour under supplying 5% by volume of $H_2$ gas using $N_2$ gas as a carrier (second heat treatment process).

Next, the mixed powder was heated under supplying 1% by volume of compressed air using $N_2$ gas as a carrier and fired at a temperature of 820° C. for 0.5 hours (first heat treatment process, first step). In addition, the mixed powder was fired under $N_2$ gas atmosphere at a temperature of 820° C. for 0.5 hours (first heat treatment process, second step).

When the infrared absorbing particle dispersion liquid was prepared, the time of pulverization and dispersion was set to 5 hours.

In Example 8, Powder A8, Dispersion Liquid B8, and the infrared absorbing laminate transparent substrate were produced and evaluated in the same manner as in Example 1 except for the above.

As indicated in Table 1, Powder A8 is infrared absorbing particles consisting of composite tungsten oxide particles having a hexagonal crystal structure.

The evaluation results are indicated in Tables 1, 2, and 6

Example 9

Tungstic acid ($H_2WO_4$) and cesium carbonate ($Cs_2CO_3$) powders were weighed and mixed at a ratio equivalent to Cs/W (molar ratio)=0.29/1.00 (mixing step).

The mixed powder was subjected to reduction treatment at 570° C. for 1 hour under supplying 5% by volume of $H_2$ gas using $N_2$ gas as a carrier (second heat treatment process).

Next, the mixed powder was heated under supplying 1% by volume of compressed air using $N_2$ gas as a carrier and fired at a temperature of 820° C. for 0.5 hours (first heat treatment process, first step). In addition, the mixed powder was fired under $N_2$ gas atmosphere at a temperature of 820° C. for 0.5 hours (first heat treatment process, second step).

When the infrared absorbing particle dispersion liquid was prepared, the time of pulverization and dispersion was set to 5 hours.

In Example 9, Powder A9, Dispersion Liquid B9, and the infrared absorbing laminate transparent substrate were produced and evaluated in the same manner as in Example 1 except for the above. The mixing step was performed under the same conditions as in Example 1, but the description is provided for confirmation.

As indicated in Table 1, Powder A9 is infrared absorbing particles consisting of composite tungsten oxide particles having a hexagonal crystal structure.

The evaluation results are indicated in Tables 1, 2, and 6.

Example 10

Tungstic acid ($H_2WO_4$) and cesium carbonate ($Cs_2CO_3$) powders were weighed and mixed at a ratio equivalent to Cs/W (molar ratio)=0.28/1.00 (mixing step).

The mixed powder was subjected to reduction treatment at 570° C. for 1 hour under supplying 5% by volume of $H_2$ gas using $N_2$ gas as a carrier (second heat treatment process).

Next, the mixed powder was heated under supplying 1% by volume of compressed air using $N_2$ gas as a carrier and fired at a temperature of 820° C. for 0.5 hours (first heat treatment process, first step). In addition, the mixed powder was fired under $N_2$ gas atmosphere at a temperature of 820° C. for 0.5 hours (first heat treatment process, second step).

When the infrared absorbing particle dispersion liquid was prepared, the time of pulverization and dispersion was set to 5 hours.

In Example 10, Powder A10, Dispersion Liquid B10, and the infrared absorbing laminate transparent substrate were produced and evaluated in the same manner as in Example 1 except for the above.

As indicated in Table 1, Powder A10 is infrared absorbing particles consisting of composite tungsten oxide particles having a hexagonal crystal structure.

The evaluation results are shown in Tables 1, 2, and 6.

Example 11

Tungstic acid ($H_2WO_4$) and cesium carbonate ($Cs_2CO_3$) powders were weighed and mixed at a ratio equivalent to Cs/W (molar ratio)=0.26/1.00 (mixing step).

The mixed powder was subjected to reduction treatment at 570° C. for 1 hour under supplying 5% by volume of $H_2$ gas using $N_2$ gas as a carrier (second heat treatment process).

Next, the mixed powder was heated under supplying 1% by volume of compressed air using $N_2$ gas as a carrier and fired at a temperature of 820° C. for 0.5 hours (first heat treatment process, first step). In addition, the mixed powder was fired under $N_2$ gas atmosphere at a temperature of 820° C. for 0.5 hours (first heat treatment process, second step).

When the infrared absorbing particle dispersion liquid was prepared, the time of pulverization and dispersion was set to 5 hours.

In Example 11, Powder A11, Dispersion Liquid B11, and the infrared absorbing laminate transparent substrate were produced and evaluated in the same manner as in Example 1 except for the above.

As indicated in Table 1, Powder A11 is infrared absorbing particles consisting of composite tungsten oxide particles having a hexagonal crystal structure.

The evaluation results are indicated in Tables 1, 2, and 6.

Example 12

Tungstic acid ($H_2WO_4$) and cesium carbonate ($Cs_2CO_3$) powders were weighed and mixed at a ratio equivalent to Cs/W (molar ratio)=0.27/1.00 (mixing step).

The mixed powder was subjected to reduction treatment at 570° C. for 1 hour under supplying 5% by volume of $H_2$ gas using $N_2$ gas as a carrier (second heat treatment process).

Next, the mixed powder was heated under supplying 1% by volume of compressed air using $N_2$ gas as a carrier and fired at a temperature of 820° C. for 1 hour (first heat treatment process, first step).

Furthermore, the mixed powder was fired at 820° C. for 0.5 hours under $N_2$ gas atmosphere (first heat treatment process, second step).

When the infrared absorbing particle dispersion liquid was prepared, the time of pulverization and dispersion was set to 8 hours.

In Example 12, Powder A12 and Dispersion Liquid B12 were produced and evaluated in the same manner as in Example 1 except for the above.

As indicated in Table 1, Powder A12 is infrared absorbing particles consisting of composite tungsten oxide particles having a hexagonal crystal structure.

The evaluation results are indicated in Tables 1 and 2.

Example 13

Tungstic acid ($H_2WO_4$) and cesium carbonate ($Cs_2CO_3$) powders were weighed and mixed at a ratio equivalent to Cs/W (molar ratio)=0.27/1.00 (mixing step).

The mixed powder was subjected to reduction treatment at 570° C. for 1 hour under supplying 5% by volume of $H_2$ gas using $N_2$ gas as a carrier (second heat treatment process).

Next, the mixed powder was heated under supplying a 1% by volume of compressed air using $N_2$ gas as a carrier and fired at a temperature of 820° C. for 1.5 hours (first heat treatment process, first step).

In addition, the mixed powder was fired under a $N_2$ gas atmosphere at a temperature of 820° C. for 0.5 hours (first heat treatment process, second step).

When the infrared absorbing particle dispersion liquid was prepared, the time of pulverization and dispersion was set to 8 hours.

In Example 13, Powder A13 and Dispersion Liquid B13 were produced and evaluated in the same manner as in Example 1 except for the above.

As indicated in Table 1, Powder A13 is infrared absorbing particles consisting of composite tungsten oxide particles having a hexagonal crystal structure.

The evaluation results are indicated in Tables 1 and 2.

Example 14

Tungstic acid ($H_2WO_4$) and cesium carbonate ($Cs_2CO_3$) powders were weighed and mixed at a ratio equivalent to Cs/W (molar ratio)=0.27/1.00 (mixing step).

The mixed powder was subjected to reduction treatment at 570° C. for 1 hour under supplying 5% by volume of $H_2$ gas using $N_2$ gas as a carrier (second heat treatment process).

Next, the mixed powder was heated under supplying 1% by volume of compressed air using $N_2$ gas as a carrier and fired at a temperature of 820° C. for 45 minutes (first heat treatment process, first step).

Furthermore, the mixed powder was fired at 820° C. for 15 minutes under $N_2$ gas atmosphere (first heat treatment process, second step).

When the infrared absorbing particle dispersion liquid was prepared, the time of pulverization and dispersion was set to 8 hours.

In Example 14, Powder A14 and Dispersion Liquid B14 were produced and evaluated in the same manner as in Example 1 except for the above.

As indicated in Table 1, Powder A14 is infrared absorbing particles consisting of composite tungsten oxide particles having a hexagonal crystal structure.

The evaluation results are indicated in Tables 1 and 2.

Example 15

Tungstic acid ($H_2WO_4$) and cesium carbonate ($Cs_2CO_3$) powders were weighed and mixed at a ratio equivalent to Cs/W (molar ratio)=0.27/1.00 (mixing step).

The mixed powder was subjected to reduction treatment at 570° C. for 1 hour under supplying 5% by volume of $H_2$ gas using $N_2$ gas as a carrier (second heat treatment process).

Next, the mixed powder was heated under supplying 1% by volume of compressed air using $N_2$ gas as a carrier and fired at a temperature of 820° C. for 2 hours (first heat treatment process, first step).

When the infrared absorbing particle dispersion liquid was prepared, the time of pulverization and dispersion was set to 8 hours.

In Example 15, Powder A15 and Dispersion Liquid B15 were produced and evaluated in the same manner as in Example 1 except for the above.

As indicated in Table 1, Powder A15 is infrared absorbing particles consisting of composite tungsten oxide particles having a hexagonal crystal structure.

The evaluation results are indicated in Tables 1 and 2.

Example 16

Using Dispersion Liquid B3 of Example 3, a composition including 0.15% by mass of cesium tungsten oxide particles as infrared absorbing particles, 73.0% by mass of polyvinyl butyral resin (PVB), and 26.85% by mass of triethylene glycol di-2-ethyl hexanoate (3GO) as a plasticizer was prepared. The composition was mixed and kneaded with a twin-screw extruder and extruded from a T-die to form a sheet material with a thickness of 0.16 mm by the calendar roll method to obtain the infrared absorbing sheet of Example 16.

The infrared absorbing laminate transparent substrate of Example 16 was obtained in the same manner as in Example 1 except that the obtained infrared absorbing sheet was sandwiched between two glass substrates with a size of 100 mm×100 mm×a thickness of 3 mm.

The evaluation results of the obtained infrared absorbing laminate transparent substrate are indicated in Table 9.

Comparative Example 1

Tungstic acid ($H_2WO_4$) and cesium carbonate ($Cs_2CO_3$) powders were weighed and mixed at a ratio equivalent to Cs/W (molar ratio)=0.33/1.00 (mixing step).

The mixed powder obtained in the mixing step was subjected to reduction treatment at 570° C. for 1 hour under supplying 5% by volume of $H_2$ gas using $N_2$ gas as a carrier.

Next, the mixed powder was fired at a temperature of 820° C. for 1 hour under an atmosphere of $N_2$ gas. It should be noted that a step that corresponds to the first step of the first heat treatment process in Example 1 was not performed in Comparative Example 1.

When the infrared absorbing particle dispersion liquid was prepared, the time of pulverization and dispersion was set to 10 hours.

Figure 6:
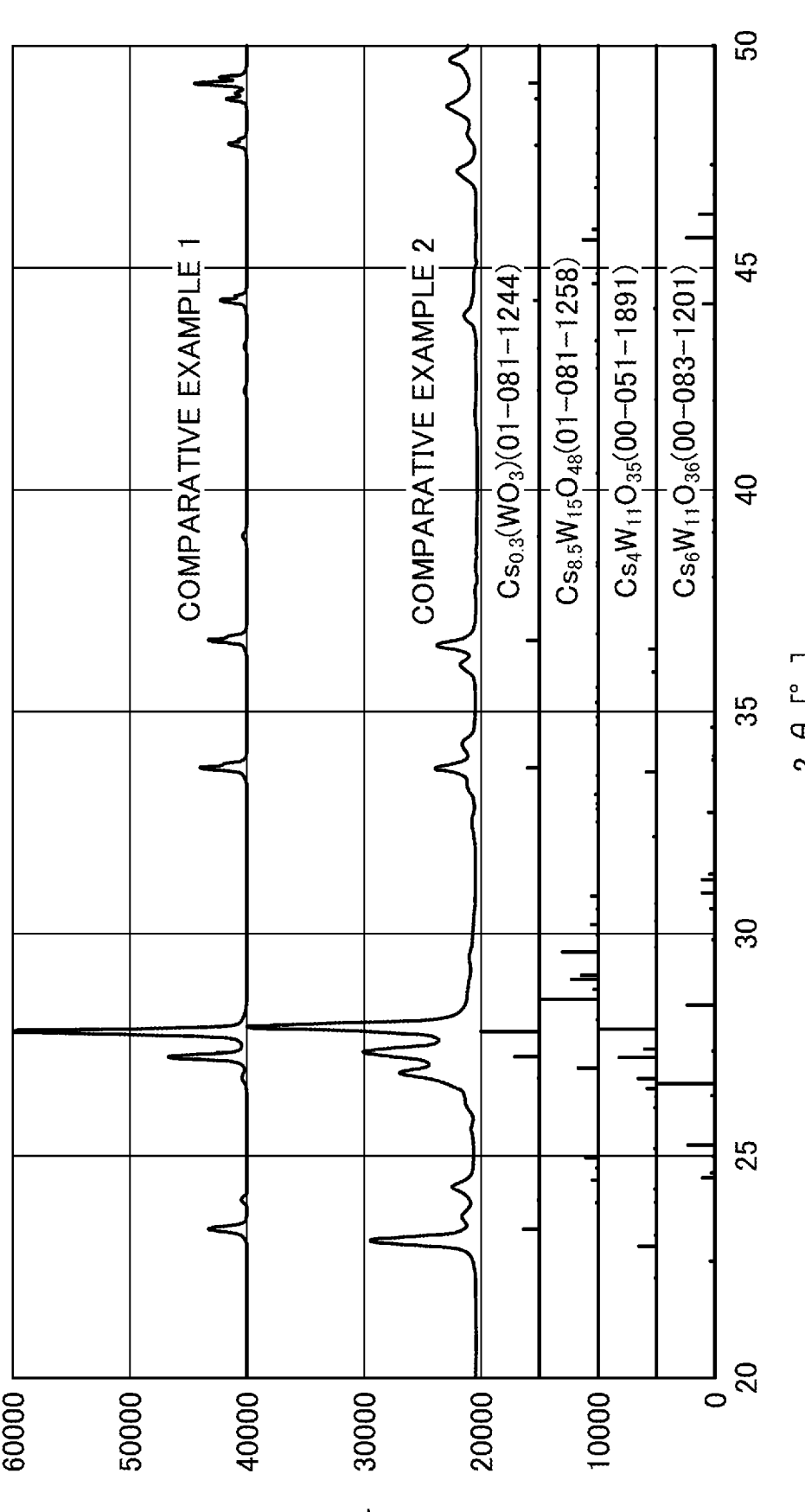
FIG. 6 is an XRD pattern of infrared absorbing particles obtained in Comparative Examples 1 and 2.

In Comparative Example 1, Powder A21, Dispersion Liquid B21, the infrared absorbing glass, the infrared absorbing film, and the infrared absorbing laminate transparent substrate were obtained in the same manner as in Example 1 except for the above. In addition, the XRD pattern of the obtained Powder A21 was measured. The evaluation results are indicated in FIG. 6 and Tables 1 to 8.

Comparative Example 2

When the infrared absorbing particles were prepared, the mixed powder was heated under supplying 1% by volume of compressed air using $N_2$ gas as a carrier and fired at a temperature of 820° C. for 0.5 hours. It should be noted that a step that corresponds to the second heat treatment process and the second step of the first heat treatment process in Example 1 were not performed in Comparative Example 2.

When the infrared absorbing particle dispersion liquid was prepared, the time of pulverization and dispersion was set to 8 hours.

In Comparative Example 2, Powder A22, Dispersion Liquid B22, and the infrared absorbing glass were obtained in the same manner as in Example 1 except for the above. In addition, the XRD pattern of the obtained Powder A22 was measured. The evaluation results are indicated in FIG. 6 and Tables 1 to 3.

Comparative Example 3

Tungstic acid ($H_2WO_4$) and cesium carbonate ($Cs_2CO_3$) powders were weighed and mixed at a ratio equivalent to Cs/W (molar ratio)=0.27/1.00. In Comparative Example 3, Powder A23 and Dispersion Liquid B23 were obtained in the same manner as in Comparative Example 1 except for the above. The evaluation results are indicated in Tables 1 and 2.

Comparative Example 4

Tungstic acid ($H_2WO_4$) and cesium carbonate ($Cs_2CO_3$) powders were weighed and mixed at a ratio equivalent to Cs/W (molar ratio)=0.26/1.00. In Comparative Example 4, Powder A24 and Dispersion Liquid B24 were obtained in the same manner as in Comparative Example 1 except for the above. The evaluation results are indicated in Tables 1 and 2.

Comparative Example 5

Tungstic acid ($H_2WO_4$) and cesium carbonate ($Cs_2CO_3$) powders were weighed and mixed at a ratio equivalent to Cs/W (molar ratio)=0.25/1.00. In Comparative Example 5, Powder A25 and Dispersion Liquid B25 were obtained in the same manner as in Comparative Example 1 except for the above. The evaluation results are indicated in Tables 1 and 2.

Comparative Example 6

Tungstic acid ($H_2WO_4$) and cesium carbonate ($Cs_2CO_3$) powders were weighed and mixed at a ratio equivalent to Cs/W (molar ratio)=0.20/1.00. In Comparative Example 6, Powder A26 and Dispersion Liquid B26 were obtained in the same manner as in Comparative Example 1 except for the above. The evaluation results are indicated in Tables 1 and 2.

Comparative Example 7

In Comparative Example 7, the infrared absorbing laminate transparent substrate was obtained in the same manner as in Example 16 except that Dispersion Liquid B21 of Comparative Example 1 was used.

Table 9 indicates the evaluation results of the obtained infrared absorbing laminate transparent substrate.

Reference Example 1

Tin-doped indium oxide powder manufactured by NYA-COL was used instead of Powder A1 to form Powder A30.

Dispersion Liquid B30 of Reference Example 1 was obtained in the same manner as in Example 1 except that Powder A30 was used. The evaluation results are indicated in Tables 1 and 2.

| | Ingredient composition (molar ratio) | | Composition ratio of chemical analysis (molar ratio) | | Lattice constant (Å) | |
|---|---|---|---|---|---|---|
| | Cs/W | Crystal structure | Cs/W | O/W | a-axis | c-axis |
| Example 1 | 0.29/1.00 | hexagonal crystal | 0.29 | 2.77 | 7.3983 | 7.6127 |
| Example 2 | 0.29/1.00 | hexagonal crystal | 0.29 | 2.77 | 7.3983 | 7.6127 |
| Example 3 | 0.27/1.00 | hexagonal crystal | 0.27 | 2.86 | 7.4168 | 7.5808 |
| Example 4 | 0.29/1.00 | hexagonal crystal | 0.28 | 2.71 | 7.4018 | 7.6046 |
| Example 5 | 0.33/1.00 | hexagonal crystal | 0.32 | 2.77 | 7.4106 | 7.5960 |
| Example 6 | 0.32/1.00 | hexagonal crystal | 0.31 | 2.71 | 7.4139 | 7.5951 |
| Example 7 | 0.31/1.00 | hexagonal crystal | 0.29 | 2.71 | 7.4139 | 7.5961 |
| Example 8 | 0.30/1.00 | hexagonal crystal | 0.29 | 2.72 | 7.4142 | 7.5909 |
| Example 9 | 0.29/1.00 | hexagonal crystal | 0.28 | 2.76 | 7.4154 | 7.5860 |
| Example 10 | 0.28/1.00 | hexagonal crystal | 0.27 | 2.86 | 7.4158 | 7.5835 |
| Example 11 | 0.26/1.00 | hexagonal crystal | 0.25 | 2.75 | 7.4173 | 7.5778 |
| Example 12 | 0.27/1.00 | hexagonal crystal | 0.27 | 2.78 | 7.4170 | 7.5809 |
| Example 13 | 0.27/1.00 | hexagonal crystal | 0.27 | 2.84 | 7.4169 | 7.5811 |
| Example 14 | 0.27/1.00 | hexagonal crystal | 0.27 | 2.77 | 7.4163 | 7.5814 |
| Example 15 | 0.27/1.00 | hexagonal crystal | 0.27 | 2.88 | 7.4165 | 7.5815 |
| Comparative Example 1 | 0.33/1.00 | hexagonal crystal | 0.32 | 2.65 | 7.4089 | 7.6175 |
| Comparative Example 2 | 0.29/1.00 | orthorhombic crystal monoclinic crystal | 0.28 | 2.83 | 7.4098 | 7.7193 |
| Comparative Example 3 | 0.27/1.00 | hexagonal crystal | 0.27 | 2.65 | 7.4133 | 7.5976 |
| Comparative Example 4 | 0.26/1.00 | hexagonal crystal | 0.26 | 2.65 | 7.4145 | 7.5942 |
| Comparative Example 5 | 0.25/1.00 | hexagonal crystal | 0.25 | 2.65 | 7.4153 | 7.5933 |
| Comparative Example 6 | 0.20/1.00 | hexagonal crystal | 0.20 | 2.65 | 7.4183 | 7.5790 |
| Reference Example 1 | — | cubic crystal | None | None | None | None |

| | Concentration of infrared absorbing particles [% by mass] | Optical properties Visible light transmittance [%] | Solar transmittance [%] | L* | a* | b* |
|---|---|---|---|---|---|---|
| Example 1 | 0.18 | 80.00 | 54.05 | 91.50 | −2.62 | 8.22 |
| Example 2 | 0.18 | 80.00 | 53.79 | 91.51 | −3.05 | 1.59 |
| Example 3 | 0.16 | 80.00 | 47.14 | 91.61 | −3.87 | 5.00 |
| Example 4 | 0.19 | 80.00 | 49.34 | 91.62 | −3.34 | 5.76 |
| Example 5 | 0.16 | 80.00 | 46.46 | 91.64 | −4.09 | 3.71 |
| Example 6 | 0.16 | 80.00 | 47.24 | 91.62 | −3.73 | 4.39 |
| Example 7 | 0.18 | 80.00 | 46.53 | 91.63 | −3.74 | 3.96 |
| Example 8 | 0.16 | 80.00 | 46.13 | 91.65 | −3.93 | 3.59 |
| Example 9 | 0.17 | 80.00 | 46.17 | 91.62 | −3.98 | 4.43 |
| Example 10 | 0.16 | 80.00 | 47.66 | 91.61 | −3.90 | 4.70 |
| Example 11 | 0.17 | 80.00 | 48.18 | 91.62 | −3.90 | 4.53 |
| Example 12 | 0.16 | 80.00 | 47.15 | 91.63 | −3.91 | 4.55 |
| Example 13 | 0.18 | 80.00 | 48.55 | 91.64 | −3.93 | 4.49 |
| Example 14 | 0.16 | 80.00 | 48.56 | 91.55 | −3.88 | 4.58 |
| Example 15 | 0.17 | 80.00 | 48.59 | 91.60 | −3.97 | 4.44 |
| Comparative Example 1 | 0.15 | 80.00 | 40.49 | 91.79 | −4.96 | −1.26 |
| Comparative Example 2 | 0.11 | 80.00 | 90.89 | 91.43 | 0.65 | 8.71 |
| Comparative Example 3 | 0.12 | 80.00 | 45.71 | 91.85 | −4.13 | −3.63 |
| Comparative Example 4 | 0.12 | 80.00 | 46.25 | 91.86 | −4.16 | −3.97 |
| Comparative Example 5 | 0.09 | 80.00 | 48.66 | 91.84 | −3.99 | −3.07 |
| Comparative Example 6 | 0.07 | 80.00 | 51.46 | 91.90 | −3.91 | −4.99 |
| Reference Example 1 | 0.52 | 80.00 | 63.41 | 91.40 | −0.10 | 10.60 |

TABLE 3

| | Substrate | | Bar coater No. | Visible light transmittance [%] | Solar transmittance [%] | Optical properties | | |
| | Type | Thickness [mm] | | | | L* | a* | b* |
|---|---|---|---|---|---|---|---|---|
| Example 1 | Glass | 3 | 16 | 76.37 | 51.36 | 89.90 | −3.12 | 6.41 |
| | PET | 0.05 | 8 | 78.26 | 59.40 | 90.81 | −1.68 | 4.09 |
| Example 2 | Glass | 3 | 16 | 79.62 | 53.79 | 91.51 | −3.05 | 1.62 |
| Example 3 | Glass | 3 | 16 | 77.67 | 47.21 | 90.64 | −3.73 | 1.57 |
| | PET | 0.05 | 8 | 79.05 | 52.29 | 91.25 | −2.56 | 1.55 |
| Example 4 | Glass | 3 | 16 | — | — | — | — | 1.38 |
| Comparative Example 1 | Glass | 3 | 16 | 78.03 | 43.14 | 90.92 | −4.04 | −2.62 |
| | PET | 0.05 | 8 | 78.44 | 46.33 | 91.08 | −3.06 | −1.87 |
| Comparative Example 2 | Glass | 3 | 16 | — | — | — | — | 8.31 |

TABLE 4

| | Evaluation of heat resistance | | | Evaluation of heat resistance | | |
| | Before exposure Visible light transmittance [%] | After exposure Visible light transmittance [%] | Before and after exposure Amount of change Δ in visible light transmittance [%] | Before exposure Solar transmittance [%] | After exposure Solar transmittance [%] | Before and after exposure Amount of change Δ in solar transmittance [%] |
|---|---|---|---|---|---|---|
| Example 1 | 76.37 | 76.15 | −0.22 | 51.36 | 50.98 | −0.38 |
| Example 3 | 77.67 | 77.98 | 0.31 | 47.21 | 47.53 | 0.32 |
| Comparative Example 1 | 78.03 | 78.95 | 0.92 | 43.14 | 44.97 | 1.83 |

TABLE 5

| | Evaluation of wet heat resistance | | | Evaluation of wet heat resistance | | |
| | Before exposure Visible light transmittance [%] | After exposure Visible light transmittance [%] | Before and after exposure Amount of change Δ in visible light transmittance [%] | Before exposure Solar transmittance [%] | After exposure Solar transmittance [%] | Before and after exposure Amount of change Δ in solar transmittance [%] |
|---|---|---|---|---|---|---|
| Example 1 | 78.26 | 79.44 | 1.18 | 59.40 | 60.56 | 1.16 |
| Example 3 | 79.05 | 78.82 | −0.23 | 52.29 | 52.69 | 0.40 |
| Comparative Example 1 | 78.44 | 79.22 | 0.78 | 46.33 | 49.01 | 2.68 |

TABLE 6

| | Optical properties of infrared absorbing laminate transparent substrate | | | |
| | Visible light transmittance [%] | Solar transmittance [%] | b* | Transmittance at 850 nm [%] |
|---|---|---|---|---|
| Example 1 | 84.29 | 67.54 | 0.50 | 43.55 |
| Example 2 | 85.23 | 76.21 | 10.05 | 42.76 |
| Example 3 | 86.64 | 72.54 | 4.23 | 30.20 |
| Example 4 | 84.62 | 71.25 | 2.53 | — |
| Example 5 | 84.93 | 73.54 | 5.36 | — |
| Example 6 | 85.67 | 74.69 | 4.85 | — |
| Example 7 | 85.41 | 74.26 | 4.53 | — |
| Example 8 | 85.31 | 73.84 | 4.32 | — |

TABLE 6-continued

| | Optical properties of infrared absorbing laminate transparent substrate | | | |
| | Visible light transmittance [%] | Solar transmittance [%] | b* | Transmittance at 850 nm [%] |
|---|---|---|---|---|
| Example 9 | 85.19 | 73.14 | 4.11 | — |
| Example 10 | 85.25 | 72.77 | 3.55 | — |
| Example 11 | 84.99 | 71.69 | 3.18 | — |
| Comparative Example 1 | 85.01 | 71.68 | 3.23 | 11.37 |

TABLE 7

| | | Evaluation of heat resistance | |
|---|---|---|---|
| | Before exposure Solar transmittance [%] | After exposure Solar transmittance [%] | Before and after exposure Amount of change Δ in solar transmittance [%] |
| Example 1 | 76.21 | 75.81 | −0.40 |
| Example 3 | 71.25 | 71.58 | 0.33 |
| Comparative Example 1 | 67.54 | 69.43 | 1.89 |

TABLE 8

| | | Evaluation of wet heat resistance | |
|---|---|---|---|
| | Before exposure Solar transmittance [%] | After exposure Solar transmittance [%] | Before and after exposure Amount of change Δ in solar transmittance [%] |
| Example 1 | 75.48 | 76.60 | 1.12 |
| Example 3 | 70.99 | 71.44 | 0.45 |
| Comparative Example 1 | 67.25 | 70.00 | 2.75 |

TABLE 9

| | Optical properties of infrared absorbing laminate transparent substrate | | | |
|---|---|---|---|---|
| | Visible light transmittance [%] | Solar transmittance [%] | b* | Transmittance at 850 nm [%] |
| Example 16 | 80.22 | 58.50 | 5.14 | 51.99 |
| Comparative Example 7 | 80.22 | 48.44 | −0.17 | 28.94 |

Summary

As is clear from each evaluation result, it was confirmed that the infrared absorbing particles of Examples 1 to 15 have a hexagonal crystal structure and are composite tungsten oxide particles having a predetermined composition.

The concentration of infrared absorbing particles in the infrared absorbing particle dispersion liquid was in a range from 0.05% by mass to 0.20% by mass when the standard for visible light transmittance was set at 80%. Since b* of the infrared absorbing particle dispersion liquid of Examples 1 to 15 was greater than 0, it was confirmed that the infrared absorbing particles contained in the infrared absorbing particle dispersion liquid were pale blue. Further, it was confirmed that the infrared absorbing laminate transparent substrate in Examples 1 to 3 and 16 has a light transmittance of 850 nm as high as 30% or higher, which is higher than that of Comparative Examples 1 and 7. That is, it was confirmed that the transmittance of signals of mobile phones and various sensors is high, and that the detection accuracy of various sensors can be enhanced.

It was also confirmed that the infrared absorbing transparent substrate evaluated in the color system was also confirmed to have b*>0 in the L*a*b* color system. In addition, in the infrared absorbing transparent substrates of Examples 1 and 3, it was confirmed that the amount of change in solar transmittance for heat resistance was 1.0% or lower, and the amount of change in solar transmittance for wet heat resistance was lower than 2.0%. It was confirmed that the infrared absorbing transparent substrates of Examples 1 and 3 were superior in weather resistance compared to the infrared absorbing transparent substrate of Comparative Example 1.

It should be noted that the infrared absorbing transparent substrates of the other examples, for which evaluation results have not been indicated, result in a similar trend in weather resistance evaluation.

That is, it was confirmed that the infrared absorbing particles having pale blue color and excellent weather resistance and infrared absorbing properties were obtained in Examples 1 to 15.

On the other hand, the infrared absorbing particles in Comparative Examples 1 and 3 to 6 had a hexagonal crystal structure, but when only light absorption by the infrared absorbing particles in the infrared absorbing particle dispersion liquid was calculated, the color tone was b*<0 in the L*a*b* color system. In addition, the infrared absorbing particles in Comparative Example 2 were a mixture of materials having a crystal structure other than hexagonal, and as evidenced by the evaluation results of the infrared absorbing particle dispersion liquid indicated in Table 2, the solar transmittance was high and the infrared absorbing properties were inferior.

The present application is based on and claims priority to Patent Application No. 2021-060997 filed on Mar. 31, 2021 and Patent Application No. 2021-140530 filed on Aug. 30, 2021 with the Japanese Patent Office, the entire contents of which are hereby incorporated by reference.

DESCRIPTION OF THE REFERENCE NUMERALS

10: Infrared absorbing particle dispersion liquid
11, 21: Infrared absorbing particles
12: Liquid medium
20, 32: Infrared absorbing particle dispersion material
22: Solid medium
30: Infrared absorbing laminate transparent substrate
311, 312, 41: Transparent substrate
40: Infrared absorbing transparent substrate
41A: One surface
42: Infrared absorbing layer

The invention claimed is:
1. Infrared absorbing particles comprising:
composite tungsten oxide particles,
wherein the composite tungsten oxide particles have a hexagonal crystal structure,
wherein the composite tungsten oxide particles are represented by a general formula $M_xW_yO_z$ where M is one or more elements selected from Cs, Rb, K, Tl, Ba, Ca, Sr, and Fe, W is tungsten, O is oxygen, $0.25 \leq x/y \leq 0.39$, and $2.84 \leq z/y \leq 2.90$, and
wherein surfaces of the composite tungsten oxide particles are oxidized by a heat treatment process under an atmosphere of a gas containing at least an oxygen source, whereby a color tone when only light absorption by the infrared absorbing particles is calculated is b*>0 in a L*a*b* color system.
2. The infrared absorbing particles according to claim 1, wherein the infrared absorbing particles are coated with a compound including one or more atoms selected from Si, Ti, Zr, and Al.

3. An infrared absorbing particle dispersion liquid comprising:

a liquid medium; and the infrared absorbing particles of claim 1 provided in the liquid medium.

4. The infrared absorbing particle dispersion liquid according to claim 3, wherein an average dispersion particle size of the infrared absorbing particles is in a range from 1 nm to 800 nm.

5. The infrared absorbing particle dispersion liquid according to claim 3, wherein the liquid medium is one selected from a liquid medium material group consisting of water, an organic solvent, oil or fat, a liquid resin, and a liquid plasticizer for plastics, or a mixture of two or more selected from the liquid medium material group.

6. The infrared absorbing particle dispersion liquid according to claim 3, wherein the infrared absorbing particle dispersion liquid includes a dispersant.

7. The infrared absorbing particle dispersion liquid according to claim 3, wherein the infrared absorbing particle dispersion liquid contains 0.001% by mass or more and 80.0% by mass or less of the infrared absorbing particles.

8. The infrared absorbing particle dispersion liquid according to claim 3, wherein a concentration of the infrared absorbing particles is 0.05% by mass or more and 0.20% by mass or less when a visible light transmittance is set to 80%.

9. An infrared absorbing particle dispersion material comprising:

a solid medium; and the infrared absorbing particles of claim 1 provided in the solid medium.

10. The infrared absorbing particle dispersion material according to claim 9, wherein the solid medium comprises a thermoplastic resin or a UV-curable resin.

11. The infrared absorbing particle dispersion material according to claim 10, wherein the thermoplastic resin comprises one resin selected from a resin group consisting of polyethylene terephthalate resin, polycarbonate resin, acrylic resin, styrene resin, polyamide resin, polyethylene resin, vinyl chloride resin, olefin resin, epoxy resin, polyimide resin, fluororesin, ethylene-vinyl acetate copolymer, and polyvinyl acetal resin; a mixture of two or more resins selected from the resin group; or a copolymer of two or more resins selected from the resin group.

12. The infrared absorbing particle dispersion material according to claim 9, wherein the infrared absorbing particle dispersion material is provided in a sheet shape, a board shape, or a film shape.

13. An infrared absorbing laminate transparent substrate comprising:

a plurality of transparent substrates; and the infrared absorbing particle dispersion material of claim 9, wherein the infrared absorbing laminate transparent substrate has a laminated structure in which the infrared absorbing particle dispersion material is arranged between the plurality of transparent substrates.

14. The infrared absorbing laminate transparent substrate according to claim 13, wherein a light transmittance at a wavelength of 850 nm is 30% or higher.

15. An infrared absorbing transparent substrate comprising:

a transparent substrate; and an infrared absorbing layer disposed on at least one surface of the transparent substrate;

wherein the infrared absorbing layer is the infrared absorbing particle dispersion material of claim 9.

16. The infrared absorbing transparent substrate according to claim 15, wherein a light transmittance at a wavelength of 850 nm is 30% or higher.

\* \* \* \* \*